(12) United States Patent
Tanimura et al.

(10) Patent No.: US 6,986,336 B2
(45) Date of Patent: Jan. 17, 2006

(54) ELECTRONICALLY CONTROLLED THROTTLE CONTROL APPARATUS

(75) Inventors: Hiroshi Tanimura, Kariya (JP); Motoki Uehama, Kariya (JP); Akihiro Kamiya, Takahama (JP); Masato Arai, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/079,290

(22) Filed: Mar. 15, 2005

(65) Prior Publication Data

US 2005/0155576 A1 Jul. 21, 2005

Related U.S. Application Data

(62) Division of application No. 10/793,053, filed on Mar. 5, 2004.

(30) Foreign Application Priority Data

| Mar. 7, 2003 | (JP) | ................ 2003-61305 |
| Mar. 18, 2003 | (JP) | ................ 2003-74432 |
| Dec. 24, 2003 | (JP) | ................ 2003-426955 |

(51) Int. Cl.
*F02M 35/00* (2006.01)

(52) U.S. Cl. ...................... 123/343; 123/361

(58) Field of Classification Search ............... 123/361, 123/399, 400, 395, 343; 137/242
See application file for complete search history.

(56) References Cited

U.S. PATENT DOCUMENTS

| 5,492,097 A | 2/1996 | Byram et al. |
| 6,349,701 B1 | 2/2002 | Sakurai et al. |
| 6,640,776 B2 | 11/2003 | Torii |
| 2003/0019521 A1 * | 1/2003 | Soubjaki ................. 137/219 |
| 2004/0045525 A1 | 3/2004 | Torii |

FOREIGN PATENT DOCUMENTS

| DE | 4207096 A1 | 9/1993 |
| EP | 1191209 A1 | 3/2002 |

* cited by examiner

*Primary Examiner*—John T. Kwon
(74) *Attorney, Agent, or Firm*—Nixon & Vanderhye P.C.

(57) ABSTRACT

An electronically controlled throttle control apparatus prevents a throttle valve from malfunctioning due to deterioration in sliding resistance ascribable to abrasive dust at a sliding contact portion between a valve gear of a geared reduction device and a coil spring. The outer periphery of a spring inner periphery guide is provided with a plurality of groove portions as abrasive dust removing means for removing abrasive dust at least from a sliding contact portion between the outer periphery of the spring inner periphery guide and the inner periphery of a default spring, so that individual edge portions of the plurality of groove portions can rub the inner periphery of the default spring to scrape off abrasive dust from the inner periphery of the default spring and direct the abrasive dust into the plurality of groove portions.

11 Claims, 14 Drawing Sheets

FIG. 15A AT THE TIME OF SHAPING — WHEN MOUNTED

OPENING SIDE — CLOSING SIDE

ELECTRONICALLY CONTROLLED THROTTLE CONTROL APPARATUS

CROSS REFERENCE TO RELATED APPLICATIONS

This application is a divisional of our copending commonly assigned application 10/793,053 filed Mar. 5, 2004 (now allowed).

This application is based upon, claims the benefit of priority of, and incorporates by reference Japanese Patent Application No. 2003-61305 filed Mar. 7, 2003, No. 2003-74432 filed Mar. 18, 2003, and No. 2003-426955 filed Dec. 24, 2003.

FIELD OF THE INVENTION

The present invention relates to an electronically controlled throttle control apparatus for controlling the amount of intake air into an internal combustion engine by adjusting the valve opening of a throttle valve through the operation of a drive motor.

BACKGROUND OF THE INVENTION

Conventionally, there have been proposed electronically controlled throttle control apparatuses which have an opener side function of mechanically holding a throttle valve in a predetermined intermediate position between a fully-closed position and a fully-open position by utilizing respective different biasing forces of a plurality of springs when the supply of an electric current to a drive motor is interrupted for any reason, thereby preventing an internal combustion engine from entering a halt state immediately so that the vehicle can run for evacuation (see publication of U.S. Pat. No. 5,492,097, pp. 1–9, FIGS. 1–9).

Nevertheless, while the conventional electronically controlled throttle control apparatuses have had the opener side function of holding the throttle valve in the intermediate position when the supply of the electric current to the drive motor is interrupted for any reason, there have been the problems of a greater number of parts and an overall higher cost since two lever members including an opener member and an intermediate stopper member and two spring members including a spring for the opener side function and a spring for a return side function are necessary. In addition, since the intermediate stopper member to come into contact with a locking part on the throttle-body side adopts the complicated configuration that it sets the intermediate position of the throttle valve via the contacting portion with the opener member, there has been the problem that the opening position of the throttle valve at the intermediate position can vary even with such variations as part tolerances.

Then, in order to solve the foregoing problems, there has been proposed a single spring (coil spring 100) structure of coil form in which, as shown in FIGS. 12 to 15B, a coupling portion between a first spring part 101 having the return side function (hereinafter, referred to as return spring function) and a second spring part 102 having the opener side function (hereinafter, referred to as opener spring function) is bent into a generally inverted U-shape to form a U-shaped hook part 103 to be fixed to an intermediate position fixed to a throttle body 114, and both sides (one end of the first spring part 101 and the other end of the second spring part 102) are wound in different directions (see Japanese Patent Laid-Open Publication No. 2002-256894, pp. 1–10, FIGS. 1–7), with the objectives of reducing the parts count of the opener mechanism of the electronically controlled throttle control apparatus for a simplified configuration and improving the opening position accuracy of the throttle valve at the intermediate position (also referred to as default position). Incidentally, 121 designates a body-side hook, 122 a gear-side hook, 123 anti-sideslip guides, 124 an engaging part formed on an opener member 106, and 125 a spring inner periphery guide on the body side.

In the electronically controlled throttle control apparatus described in Japanese Patent Laid-Open Publication No. 2002-256894, when a throttle valve 104 and a throttle shaft 105 are closed from the intermediate position toward the fully-closed position, the U-shaped hook part 103 of the single coil spring 100 is locked by an intermediate stopper member 115. Additionally, the opener member 106 is integrally formed on an opposed surface of a valve gear 111 constituting a component of a power transmission device (for example, a geared reduction device composed of the valve gear 111, an intermediate reduction gear 112, and a pinion gear 113) and transmits rotational power of a drive motor 110 to the throttle valve 104. The throttle shaft 105 rotates with the other end of the second spring part 102, or a spring gear-side hook 107, to generate a biasing force in the direction of returning from the fully-closed position to the intermediate position while a spring inner periphery guide 108 for holding the inner side of the second spring part 102 of the single coil spring 100 makes a large relative movement with respect to the inner periphery of the second spring part 102.

The foregoing has thus yielded a new problem that when the throttle valve 104 and the throttle shaft 105 are closed from the default position toward the fully-closed position, the relative movement between the outer periphery of the spring inner periphery guide 108 integrally formed on the opposed surface of the valve gear 111 along with the opener member 106 and the inner periphery of the second spring part 102 of the single coil spring 100 can produce a large sliding resistance. This resistance can potentially cause a malfunction of the throttle valve 104 and the throttle shaft 105 and an increase in the rotational load of the drive motor 110.

In the electronically controlled throttle control apparatus described in the foregoing Japanese Patent Laid-Open Publication No. 2002-256894, when the throttle valve is closed from the intermediate position toward the fully-closed position, the U-shaped hook part of the coil spring is locked by the intermediate stopper member and the opener member rotates with an end of the second spring part, or a spring-gear-side hook, to produce a biasing force for returning from the fully-closed position to the intermediate position while the spring inner periphery guide for holding the inside of the coil spring makes a large relative movement with respect to the inner periphery of the second spring part of the coil spring.

Consequently, when the throttle valve is closed from the intermediate position toward the fully-closed position, there occur the problems that the relative movement between the outer periphery of the spring inner periphery guide and the inner periphery of the second spring part causes malfunction of the throttle valve, and that sliding friction between the outer periphery of the spring inner periphery guide and the inner periphery of the second spring part produces abrasive dust.

In particular, the abrasive dust may be rubbed firmly against the outer periphery of the spring inner periphery guide or the inner periphery of the second spring part by the sliding friction between the outer periphery of the spring inner periphery guide and the inner periphery of the second spring part. When the abrasive dust is thus rubbed against the surface of the spring inner periphery guide or the second spring part, the spring inner periphery guide or the second spring part gets warped at the surface, giving rise to the problem that the sliding resistance in the relative movement between the outer periphery of the spring inner periphery guide and the inner periphery of the second spring part, i.e., the sliding resistance ascribable to the intervention of the abrasive dust between the outer periphery of the spring inner periphery guide and the inner periphery of the second spring part is made even greater to promote further malfunction of the throttle valve.

Moreover, when the spring inner periphery guide is integrally formed on a valve gear which constitutes a component of a power transmission device (such as a reduction gear device) for transmitting the rotational power of the drive motor to the throttle shaft for holding and fixing the throttle valve, there occurs the problem that the power transmission device causes a malfunction if the foregoing abrasive dust is scattered into a gear case accommodating the power transmission device and adheres to the gear meshing part.

SUMMARY OF THE INVENTION

Therefore, an object of the present invention is to provide an electronically controlled throttle control apparatus which can remove abrasive dust occurring from a member for making sliding contact with the coil spring or abrasive dust occurring from the coil spring itself because of sliding contact with the member, i.e., abrasive dust resulting from sliding friction between the coil spring and the member in sliding contact with this coil spring at least from a sliding contact portion between the power transmission device and the coil spring, thereby preventing the throttle valve from malfunctioning due to a deterioration in sliding resistance ascribable to the intervention of the abrasive dust in the sliding contact portion between the power transmission device and the coil spring. Another object is to provide an electronically controlled throttle control apparatus which can avoid malfunction of the power transmission device for transmitting the rotational power of the actuator to the throttle valve and the throttle shaft.

Embodiments of the invention relate to an electronically controlled throttle control apparatus utilizing a single coil spring which is bent into a U-shape in the middle to form a U-shaped hook part to be fixed to an intermediate position, and wound in different directions at both ends. Additionally, a power transmission device has a spring inner periphery guide for holding the inner side of this coil spring. Furthermore, the present invention relates to an electronically controlled throttle control apparatus for controlling the amount of intake air into an internal combustion engine by adjusting the valve opening of a throttle valve through the operation of a drive motor, and more particularly, to an electronically controlled throttle control apparatus having: a single coil spring which is bent into a U-shape in the middle to form a U-shaped hook part to be fixed to an intermediate position, and wound in different directions at both ends. Additionally, a power transmission device has a spring inner periphery guide for supporting the coil inner side of this coil spring.

According to the invention set forth in a first aspect, a power transmission device (a rotator such as a throttle shaft and a valve gear) for transmitting rotational power of an actuator to a throttle valve is provided with an abrasive dust removing means. This makes it possible to remove abrasive dust occurring from a member that makes sliding contact with a coil spring or abrasive dust occurring from the coil spring itself because of sliding contact with the member, at least from a sliding contact portion between the power transmission device and the coil spring. Consequently, it becomes difficult for the abrasive dust occurring from the member for making sliding contact with the coil spring or the abrasive dust occurring from the coil spring itself because of sliding contact with the member to lie at least in the sliding contact portion between the power transmission device and the coil spring, so that the foregoing abrasive dust becomes less likely to be rubbed against the surface of the power transmission device or the surface of the coil spring at the time of sliding friction due to relative movement between the power transmission device and the coil spring.

It is therefore possible to suppress malfunction of the throttle valve since the above-mentioned deterioration in the sliding resistance of the sliding contact portion during a relative movement between the power transmission device and the coil spring, i.e., the deterioration of the sliding resistance ascribable to the intervention of abrasive dust in the sliding contact portion between the power transmission device and the coil spring can be suppressed.

According to the invention set forth in a second aspect, the throttle valve is held and fixed by a throttle shaft rotatably supported by the throttle body. Then, the power transmission device is provided with a rotator for rotationally driving the throttle shaft which holds and fixes the throttle valve, so that the rotational power of the actuator can be transmitted to the throttle valve and the throttle shaft via the rotator.

According to the invention set forth in a third aspect, a plurality of concave portions or convex portions are formed in/on the outer periphery of the rotator as the abrasive dust removing means. These concave portions or convex portions are arranged at predetermined circumferential intervals over the entire outer periphery of the rotator or arranged at predetermined circumferential intervals only across a sliding contact portion of the rotator with the coil spring, so that abrasive dust occurring from the member for making sliding contact with the coil spring or abrasive dust occurring from the coil spring itself because of sliding contact with the member can be actively captured (swept) into the plurality of concave portions or between two adjoining convex portions formed in/on the outer periphery of the rotator. Consequently, the abrasive dust occurring from the member for making sliding contact with the coil spring or the abrasive dust occurring from the coil spring itself because of sliding contact with the member can be removed at least from the sliding contact portion between the power transmission device and the coil spring.

According to the invention set forth in a fourth aspect, a plurality of concave portions or convex portions are formed in/on the outer periphery of a spring inner periphery guide of the rotator as the abrasive dust removing means. These concave portions or convex portions are arranged at predetermined circumferential intervals over the entire outer periphery of the spring inner periphery guide or arranged at predetermined circumferential intervals only across a sliding contact portion of the spring inner periphery guide with the coil spring, so that abrasive dust occurring from the member for making sliding contact with the coil spring or abrasive dust occurring from the coil spring itself because of sliding contact with the member can be actively captured (swept) into the plurality of concave portions or between two adjoining convex portions formed in/on the outer periphery of the spring inner periphery guide. Consequently, the abrasive dust occurring from the member for making sliding contact with the coil spring or the abrasive dust occurring from the coil spring itself because of sliding contact with the member can be removed at least from the sliding contact portion between the outer periphery of the spring inner periphery guide of the rotator and the inner periphery of the coil spring.

According to the invention set forth in a fifth aspect, the rotator is integrally provided with an opener member for making integral rotation with the throttle shaft. Then, a first spring part of the coil spring has a return spring function, so that when the throttle valve is operated within an operation range between an intermediate position and a fully-open position, the throttle valve can be returned from the side of the fully-open position to the intermediate position through the intermediary of the opener member. In addition, a second spring part of the coil spring has an opener spring function (default spring function), so that when the throttle valve is operated within an operation range between the intermediate position and a fully-closed position, the throttle valve can be returned from the side of the fully-closed position to the intermediate position through the intermediary of the opener member.

According to the invention set forth in a sixth aspect, the coil spring adopts a single spring structure of coil form in which a coupling portion between the first spring part and the second spring part is bent into a generally inverted U-shape to form a U-shaped hook part, and one axial end of the first spring part and the other axial end of the second spring part are wound in different directions. This can reduce the number of parts with the effect of reducing the cost.

According to the invention set forth in a seventh aspect, the throttle body is provided with an intermediate stopper member for locking the U-shaped hook part to hold the throttle valve in the intermediate position when electric power to the actuator (such as a drive motor) is interrupted for any reason, and a first locking part for locking one end of the first spring part. Besides, the opener member is provided with an engaging part for detachably engaging with the U-shaped hook part, and a second locking part for locking the other end of the second spring part. Consequently, the throttle valve is securely held in the predetermined position (intermediate position) between the fully-closed position and the fully-open position. Thus, even if the supply of the electric power to the actuator is interrupted for any reason, at least a minimum necessary amount of intake air can be fed into the internal combustion engine so that the internal combustion engine is prevented from stopping immediately and the vehicle can be driven.

According to the invention set forth in an eighth aspect, a plurality of concave portions or convex portions are formed in/on the outer periphery of a spring inner periphery guide of a valve gear (rotator) as the abrasive dust removing means. These concave portions or convex portions are arranged at predetermined circumferential intervals over the entire outer periphery of the spring inner periphery guide or arranged at predetermined circumferential intervals only across a sliding contact portion of the spring inner periphery guide with the second spring part, so that abrasive dust occurring from the member for making sliding contact with the coil spring or abrasive dust occurring from the coil spring itself because of sliding contact with the member can be actively captured (swept) into the plurality of concave portions or between two adjoining convex portions formed in/on the outer periphery of the spring inner periphery guide. Consequently, the abrasive dust occurring from the member for making sliding contact with the coil spring or the abrasive dust occurring from the coil spring itself because of sliding contact with the member can be removed at least from the sliding contact portion between the outer periphery of the spring inner periphery guide of the valve gear (rotator) and the inner periphery of the second spring part of the coil spring.

According to the invention set forth in a ninth aspect, a plurality of concave portions or convex portions are formed in/on the outer peripheries of the power transmission device, the spring inner periphery guide of the rotator, and the spring inner periphery guide of the valve gear as the abrasive dust removing means. These concave portions or convex portions are provided with edge portions so that abrasive dust adhering to the coil spring can be scraped off and then actively captured (swept) into the plurality of concave portions or two adjoining convex portions. Consequently, the abrasive dust occurring from the member for making sliding contact with the coil spring or the abrasive dust occurring from the coil spring itself because of sliding contact with the member can be removed at least from the sliding contact portion between the power transmission device and the coil spring.

It is therefore possible to suppress malfunctions of the throttle valve since the above-mentioned deterioration in the sliding resistance of the sliding contact portion during relative movement between the power transmission device and the coil spring, i.e., the deterioration of the sliding resistance ascribable to the intervention of abrasive dust in the sliding contact portion between the power transmission device and the coil spring can be suppressed.

According to the invention set forth in a tenth aspect, a power transmission device for transmitting rotational power of an actuator to a throttle valve is provided with abrasive dust anti-scattering means such as a cover for annularly surrounding a sliding contact portion between the power transmission device and a coil spring. This can prevent abrasive dust occurring from a member for making sliding contact with the coil spring or abrasive dust occurring from the coil spring itself, because of sliding contact with the member, from being scattered at least from the sliding contact portion between the power transmission device and the coil spring (for example, toward a gear meshing part of the power transmission device). Consequently, the power transmission device for transmitting the rotational power of the actuator to the throttle valve can be prevented from malfunctioning.

According to the invention set forth in an eleventh aspect, abrasive dust occurring from a member for making sliding contact with the coil spring can be actively captured (swept) into the plurality of concave portions or between two adjoining convex portions formed in/on the outer periphery of the spring inner periphery guide of a rotator such as the valve gear, which constitutes a component of the power transmission device. Otherwise, abrasive dust occurring from a member for making sliding contact with the coil spring or abrasive dust occurring from the coil spring itself because of sliding contact with the member can be prevented from being scattered at least from the sliding contact portion between the power transmission device and the coil spring (for example, toward a gear meshing part of the power transmission device). Consequently, no abrasive dust will be scattered into an actuator case which rotatably accommodates the individual gears constituting a reduction gear device, and it becomes less likely for abrasive dust to adhere to the gear meshing part of the power transmission device. It is therefore possible to avoid malfunction of the throttle valve and the throttle shaft, and malfunction of the power transmission device for transmitting the rotational power of the actuator to the throttle valve.

An object of the present invention is to provide an electronically controlled throttle control apparatus which can reduce the sliding resistance between the rotator of the power transmission device and the single coil spring significantly, thereby reducing the rotational load on the actuator such as a drive motor and avoiding malfunction of the throttle valve.

According to the invention set forth in a twelfth aspect, a single coil spring having one end locked by a throttle body and the other end locked by a rotator of a power transmission device is given a coil configuration in which the center axis of the coil spring is previously decentered in a direction opposite to that of deformation occurring when the other end of the coil spring is mounted onto the rotator. This makes it possible to form a cylindrical gap between the rotator and the coil spring when the one end of the coil spring is mounted on the throttle body and the other end of the coil spring is mounted on the rotator.

Consequently, even if the throttle valve is rotationally driven by the actuator with relative movement between the rotator and the coil spring, it becomes less likely for the rotator and the coil spring to make sliding contact. The sliding resistance during the relative movement between the rotator and the coil spring can thus be reduced significantly as compared to the convention articles. It is therefore possible to avoid malfunction of the throttle valve and reduce the rotational load on the actuator such as a drive motor, allowing miniaturization of the actuator such as a drive motor. In addition, since the sliding portion between the rotator and the coil spring can be prevented from wearing, it is possible to avoid secular deterioration of the sliding resistance.

According to the invention set forth in a thirteenth aspect, the foregoing coil spring is mounted between an external wall surface of the throttle body and an opposed surface of the rotator. Then, a regular pitch coil having a coil outside diameter generally constant in the direction of the center axis and a constant coil pitch, a variable pitch coil having a coil outside diameter generally constant in the direction of the center axis and varying coil pitches, or a nonlinear spring varying in the coil outside diameter in the direction of the center axis may be used as the foregoing coil spring.

According to the invention set forth in a fourteenth aspect, a spring inner periphery guide for holding a coil inner side of the coil spring and making relative operation with the coil spring and an opener member for making integral rotation with the throttle valve and being biased by the coil spring in the fully-open direction or the fully-closed direction are integrally formed, for example, on an opposed surface of the rotator (such as a throttle shaft or a valve gear) constituting a component of the power transmission device for transmitting the rotational power of an actuator to the throttle valve. The opposed surface is opposed to an external wall surface of the throttle body. In this case, even when the throttle valve is rotationally driven by the actuator with relative movement between the outer periphery of the spring inner periphery guide of the rotator and the inner periphery of the coil spring, it becomes less likely for the outer periphery of the spring inner periphery guide and the inner periphery of the coil spring to make sliding contact. Therefore, the sliding resistance during the relative movement between the outer periphery of the spring inner periphery guide and the inner periphery of the coil spring can be reduced significantly as compared to the conventional articles.

According to the invention set forth in a fifteenth aspect, a first spring part of the coil spring has a return spring function, so that when the throttle valve is operated within an operation range between an intermediate position and a fully-open position, the throttle valve can be returned from the side of the fully-open position to the intermediate position through the intermediary of the opener member. In addition, a second spring part of the coil spring has an opener spring function (default spring function), so that when the throttle valve is operated within an operation range between the intermediate position and a fully-closed position, the throttle valve can be returned from the side of the fully-closed position to the intermediate position through the intermediary of the opener member.

According to the invention set forth in a sixteenth aspect, the coil spring adopts a single spring structure of coil form in which a coupling portion between the first spring part and the second spring part is bent into a generally inverted U-shape to form a U-shaped hook part, and one axial end of the first spring part and the other axial end of the second spring part are wound in different directions. This allows a reduction in parts and a reduction in cost.

According to the invention set forth in a seventeenth aspect, the throttle body is provided with an intermediate stopper member for locking the U-shaped hook part to hold the throttle valve in the intermediate position when electric power to the actuator (such as a drive motor) is interrupted for any reason, and a first locking part for locking one end of the first spring part. Besides, the opener member is provided with an engaging part for detachably engaging with the U-shaped hook part, and a second locking part for locking the other end of the second spring part. Consequently, the throttle valve is securely held in the predetermined position (intermediate position) between the fully-closed position and the fully-open position. Thus, even if the supply of electric power to the actuator is interrupted for any reason, at least a minimum necessary amount of intake air can be fed into the internal combustion engine so that the internal combustion engine is prevented from stopping immediately and the vehicle can be driven.

Here, in this case, the amount of offset (the amount of rotational deformation) of the second spring part to occur when the single coil spring is mounted, i.e., when the coupling portion between the first spring part and the second spring part, or the U-shaped hook part, is set to the engaging part formed on the opener member of the rotator (such as a throttle shaft or a valve gear) and the other end of the second spring part is set to the second locking part formed on the opener member is preloaded to the single coil spring in the opposite direction at the time of shaping. This can provide the effect of reducing the amount of offset of the second spring part when the single coil spring is mounted onto the electronically controlled throttle control apparatus.

According to the invention set forth in an eighteenth aspect, when one end of the first spring part of the single coil spring is mounted on (the first locking part of) the throttle body and the other end of the second spring part of the single coil spring is mounted on (the second locking part of) the valve gear, the outer periphery of the spring inner periphery guide of the valve gear and the inner periphery (inner side) of the second spring part of the coil spring form generally concentric circles, so that a cylindrical gap can be formed between the spring inner periphery guide of the valve gear and the second spring part of the coil spring. Consequently, even when the throttle valve and the throttle shaft are rotationally driven by the actuator with a relative movement between the outer periphery of the spring inner periphery guide of the valve gear and the inner periphery of the second spring part of the coil spring, it becomes less likely for the outer periphery of the spring inner periphery guide of the valve gear and the inner periphery of the second spring part of the coil spring to make sliding contact; therefore, the sliding resistance during the relative movement between the outer periphery of the spring inner periphery guide of the valve gear and the inner periphery of the second spring part of the coil spring can be reduced significantly as compared to the conventional articles.

Incidentally, the opener member for making integral rotation with the throttle valve and the throttle shaft may be integrally provided with the foregoing second locking part for locking the other end of the second spring part of the coil spring, an engaging part for detachably engaging with the coupling portion between the first spring part and the second spring part, or the foregoing U-shaped hook part, and a plurality of anti-sides lip guides (axial restraining means) for restraining further axial movement of the U-shaped hook part of the coil spring.

According to the invention set forth in a nineteenth aspect, the rotator is provided with an engaging part for detachably engaging with the U-shaped hook part, and a locking part for locking the other end of the coil spring in the circumferential direction of this engaging part (for example, generally on the same circumference as the engaging part). Consequently, when the U-shaped hook part of the coil spring is mounted on the engaging part of the rotator and the other end of the coil spring is mounted on the locking part of the rotator, it is possible to prevent the rotation of the coil spring and form a cylindrical gap between the spring inner periphery guide integrally formed on the rotator and the coil spring. This allows a further reduction of the sliding resistance during the relative movement between the outer periphery of the spring inner periphery guide of the rotator and the inner periphery of the coil spring.

According to the invention set forth in a twentieth aspect, the rotator is provided with an engaging part for detachably engaging with the U-shaped hook part, and a locking part for locking the other end of the coil spring in the circumferential direction of this engaging part (for example, generally on the same circumference as the engaging part). Consequently, when the U-shaped hook part of the coil spring is mounted on the engaging part of the rotator and the other end of the coil spring is mounted on the locking part of the rotator, it is possible to prevent the rotation of the coil spring and form a cylindrical gap between the rotator and the coil spring. Here, if the spring inner periphery guide for holding the coil inner side of the coil spring and making relative operation with the coil spring is integrally formed on the rotator, a cylindrical gap can be formed between the spring inner periphery guide that is integrally formed on the rotator and the coil spring.

As a result, even if the throttle valve is rotationally driven by the actuator with a relative movement between the rotator and the coil spring, it becomes less likely for the rotator and the coil spring to make sliding contact; therefore, the sliding resistance during the relative movement between the rotator and the coil spring can be reduced significantly as compared to the convention articles. It is therefore possible to avoid malfunction of the throttle valve and reduce the rotational load on the actuator such as a drive motor, allowing miniaturization of the actuator such as a drive motor. In addition, since the sliding portion between the rotator and the coil spring can be prevented from wearing, it is possible to avoid secular deterioration of the sliding resistance.

BEST MODE FOR CARRYING OUT THE INVENTION

The best mode for carrying out the present invention has achieved the object of reducing the rotational load on the actuator such as a drive motor and avoiding malfunction of the throttle valve through a significant reduction in the sliding resistance between a rotator of the power transmission device and the single coil spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
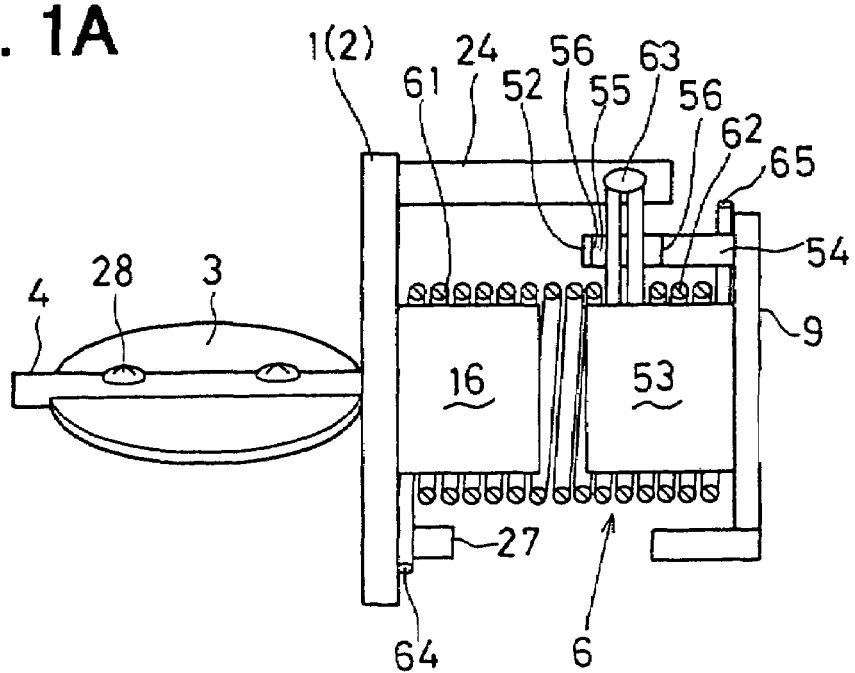
FIGS. 1A and 1B are explanatory diagrams of structures of an electronically controlled throttle control apparatus according to a first embodiment of the present invention.
Figure 1B:
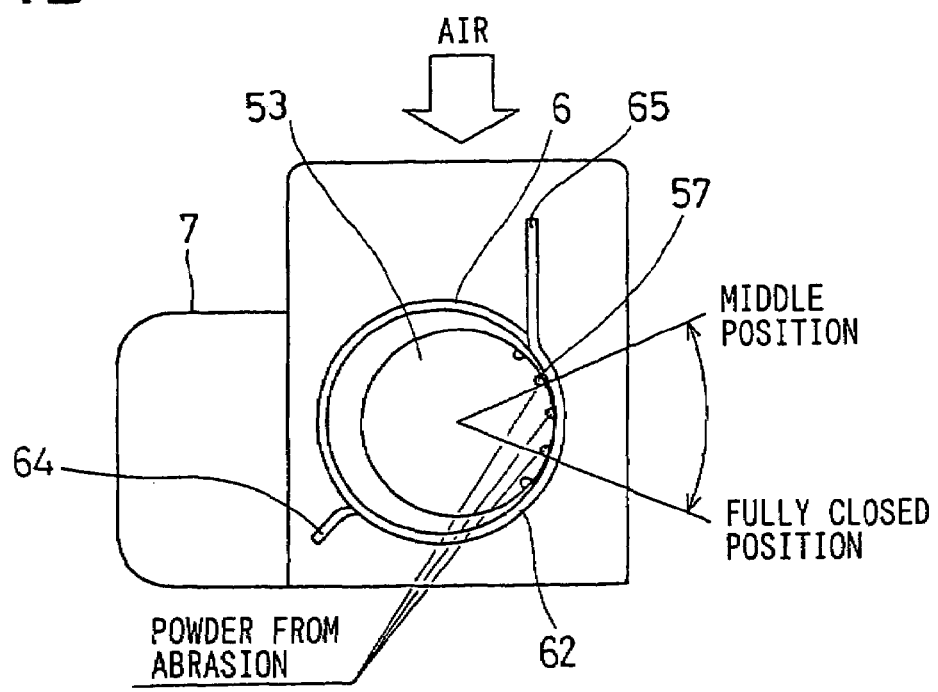
Figure 2:
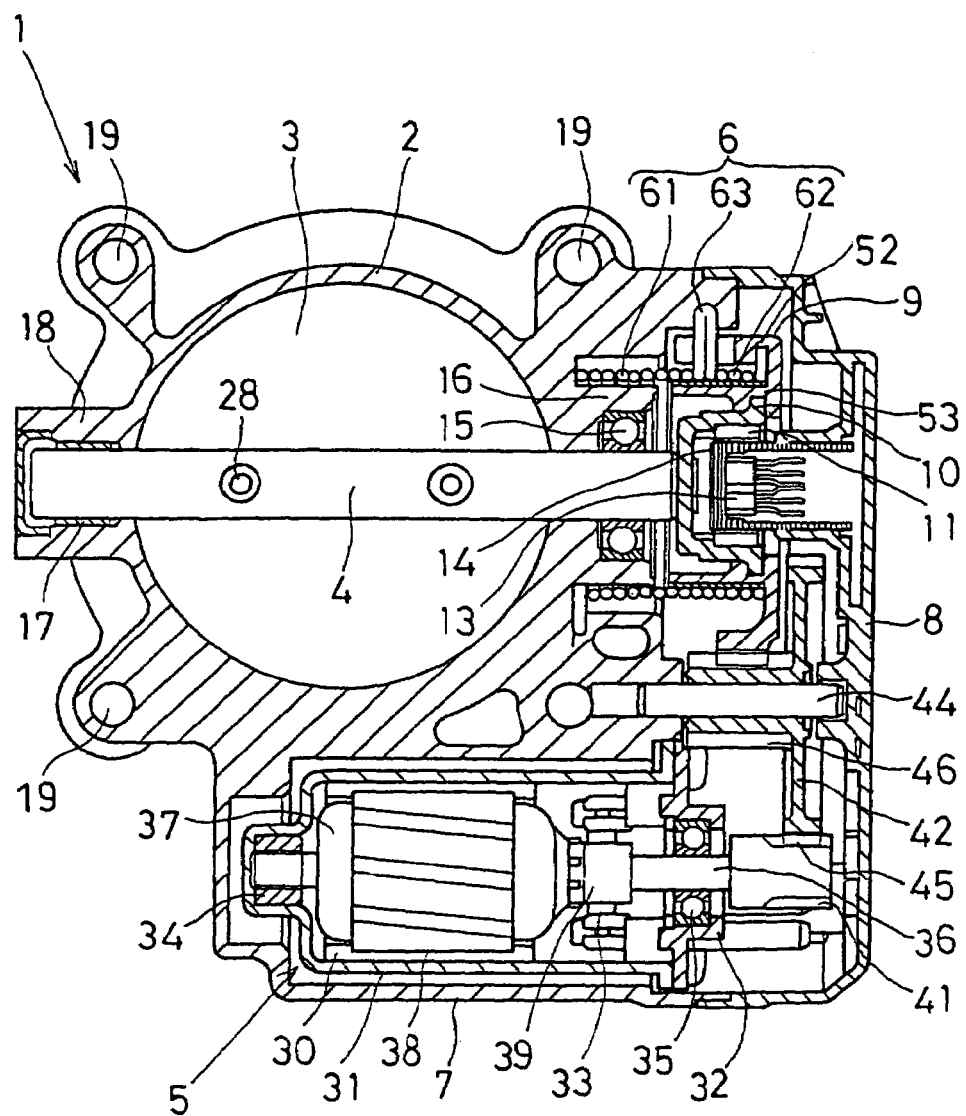
FIG. 2 is a cross-sectional view of the general structure of the electronically controlled throttle control apparatus according to a first embodiment of the present invention.
Figure 3:
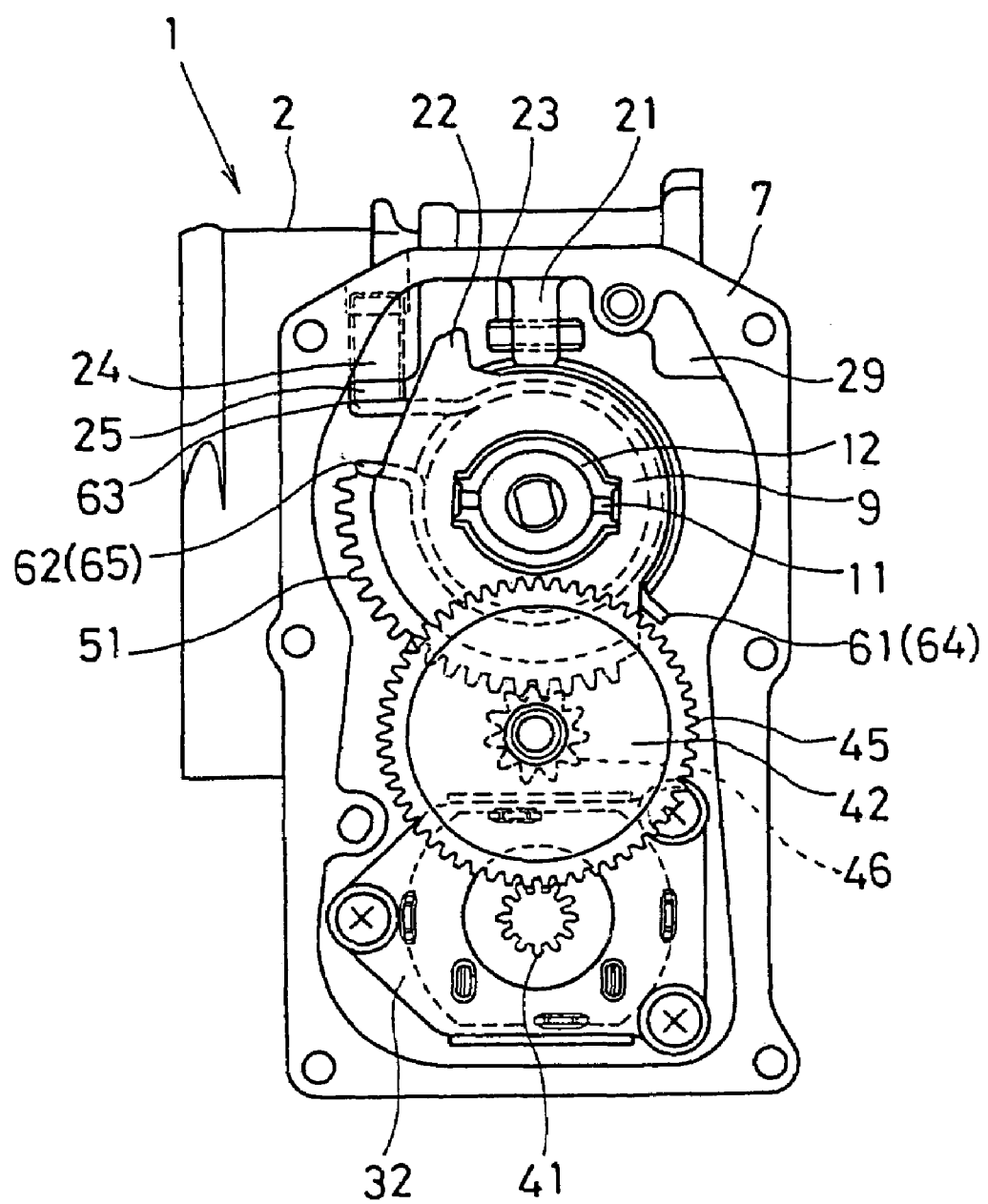
FIG. 3 is a front view of individual components such as a drive motor and a geared reduction device according to a first embodiment of the present invention.
Figure 4:
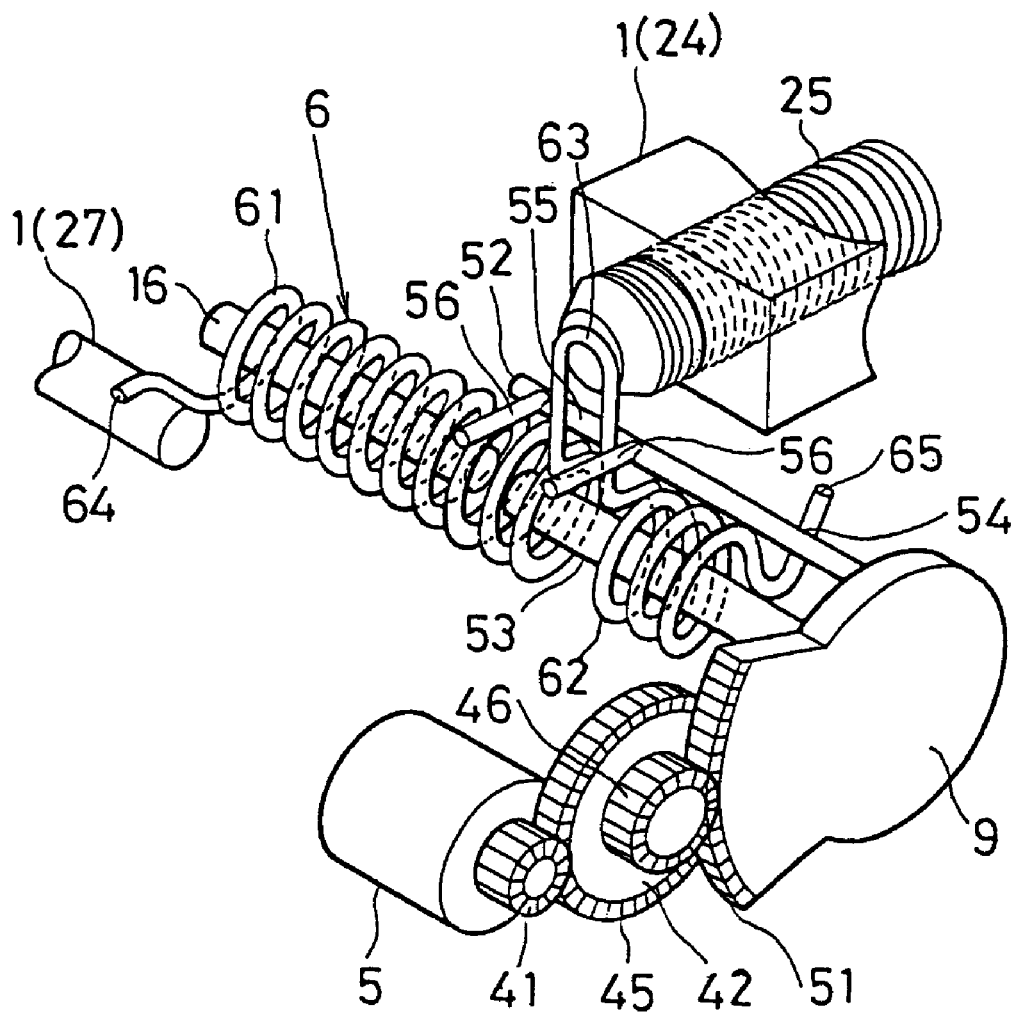
FIG. 4 is a perspective view of a schematic structure of the electronically controlled throttle control apparatus according to a first embodiment of the present invention.
Figure 5A:
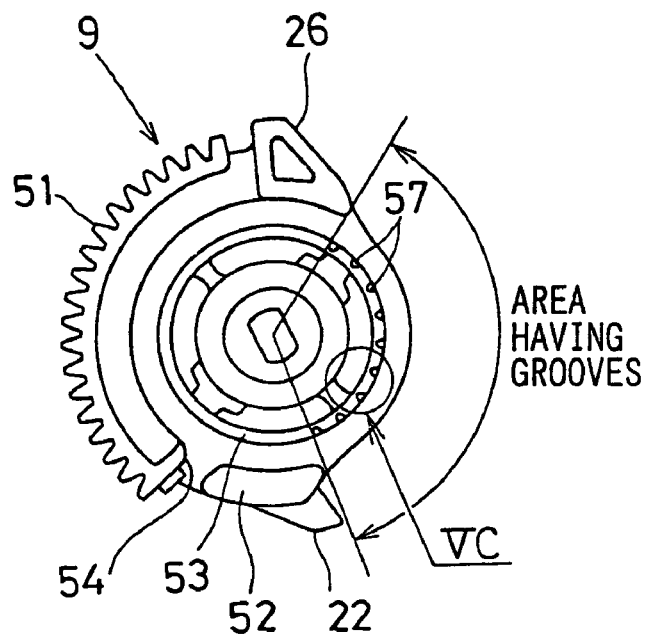
FIG. 5A is a front view of a valve gear.
Figure 5B:
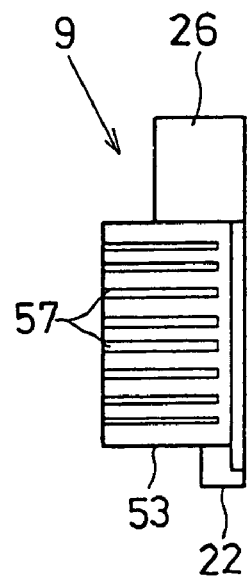
FIG. 5B is a side view of the valve gear.
Figure 5C:
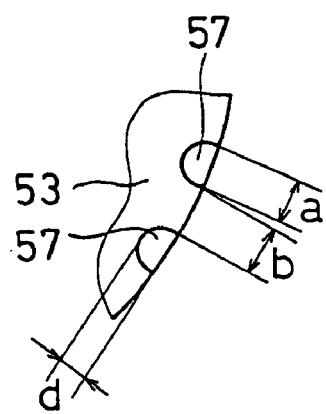
FIG. 5C is a front view of an enlarged part of the valve gear according to a first embodiment of the present invention.

FIGS. 1A through 5B show an embodiment of the present invention. FIGS. 1A and 1B show an essential structure of an electronically controlled throttle control apparatus. FIG. 2 is a diagram showing the general structure of the electronically controlled throttle control apparatus. FIG. 3 is a diagram showing individual components, such as a drive motor and a geared reduction device, constituted inside a gear case which is formed integrally on an external wall surface of a throttle body. FIG. 4 is a diagram showing a schematic structure of the electronically controlled throttle control apparatus.

The electronically controlled throttle control apparatus of the present embodiment is an intake control apparatus for an internal combustion engine having: a throttle body 1 which forms an intake duct to each cylinder of the internal combustion engine (engine); a throttle valve 3 which is openably/closably accommodated in a cylindrical bore wall part 2 of this throttle body 1 and adjusts the amount of intake air into the engine; a throttle shaft 4 which holds this throttle valve 3 and is rotatably supported by a bearing support part of the bore wall part 2; a drive motor (actuator, valve driving means) 5 which rotationally drives the throttle valve 3 and the throttle shaft 4 in a fully-open direction or a fully-closed direction; a geared reduction device (power transmission device) which transmits the rotational output of the drive motor 5 to the throttle valve 3 and the throttle shaft 4; and an engine control device (engine control unit: hereinafter, referred to as ECU) which electronically controls the drive motor 5.

As shown in FIGS. 1A through 4, the electronically controlled throttle control apparatus of the present embodiment also comprises a coil spring (valve biasing means) 6 in which a first spring part (hereinafter, referred to as return spring) 61 having a return spring function and a second spring part (hereinafter, referred to as default spring) having an opener spring function are integrated to bias the throttle valve 3 in the fully-closed direction or the fully-open direction. This coil spring 6 is mounted between the external wall surface (the right end in the diagram) of the bore wall part 2 of the throttle body 1, i.e., the cylindrically-recessed bottom wall surface of a gear case 7 and the left end of a valve gear 9 in the diagram, and is given a single spring structure of coil form in which the coupling portion (the middle) between the return spring 61 and the default spring 62 is bent into a generally inverted U-shape to form a U-shaped hook part 63 to be held by an intermediate stopper member 25 and both ends are wound in different directions.

Then, the electronically controlled throttle control apparatus controls the rotational speed of the engine by controlling the amount of intake air flowing into the engine based on the degree to which the accelerator pedal (not shown) of the vehicle is stepped down (the amount of accelerator operation). Incidentally, the ECU is connected with an accelerator opening sensor (not shown) for converting the degree of stepping of the accelerator pedal into an electric signal (accelerator opening signal) and outputting to the ECU how far the accelerator pedal is stepped down.

The electronically controlled throttle control apparatus also comprises a throttle position sensor for converting the opening of the throttle valve 3 into an electric signal (throttle opening signal) and outputting to the ECU how far the throttle valve 3 is opened. This throttle position sensor is composed of: a rotor 10 fixed to the right end of the throttle shaft 4 in the diagram by such fixing means as caulking; permanent magnets 11 of split type (generally rectangular shape) as a magnetic field generating source; yokes (magnetic body) 12 of split type (generally arcuate shape) to be magnetized by these permanent magnets 11; a Hall device 13 integrally formed on the side of a gear cover 8 so as to be opposed to the permanent magnets 11 of split type; terminals (not shown) made of a conductive metal sheet for establishing electric connection between this Hall device 13 and the external ECU; and a stator 14 made of iron type metal material (magnetic material) for focusing a magnetic flux onto the Hall device 13.

The permanent magnets 11 of split type and the yokes 12 of split type are fixed, by using an adhesive or the like, to the inner periphery of the rotor 10 which is insert-molded in the valve gear 9, a component of the geared reduction device. Incidentally, the permanent magnets 11 of split type are arranged between the two adjoining yokes 12. The permanent magnets 11 of split type according to the present embodiment are arranged so that the same poles of the permanent magnets of generally rectangular shape, polarized in the vertical directions in FIG. 3 (the N poles upward in the diagram, the S poles downward in the diagram), fall on the same sides. The Hall device 13 corresponds to a detecting device of noncontact type, and is arranged to face the inner side of the permanent magnets 11 so that it generates an electromotive force in response to the magnetic fields of the N poles or the S poles when the magnetic fields occur on the sensing plane (a positive potential is generated when the magnetic fields of the N poles occur, and a negative potential is generated when the magnetic fields of the S poles occur).

The throttle body 1 is an apparatus which is made of metal material such as die-cast aluminum and holds the throttle valve 3 rotatably in the direction of rotation from the fully-closed position through the fully-open position inside the intake duct having a generally circular section formed in the bore wall part 2, and is fastened and fixed to the intake manifold of the engine by using fasteners (not shown) such as a fixing bolt and a fastening screw. This throttle body 1 is provided with: a bearing supporting part 16 of cylindrical shape for rotatably supporting the right end (one end) of the throttle shaft 4 in the diagram via a ball bearing (bearing) 15; a bearing support part 18 of cylindrical shape for rotatably supporting the left end (the other end) of the throttle shaft 4 in the diagram via a dry bearing (bearing) 17; and an actuator case for accommodating the drive motor 5 and the geared reduction device.

Here, the actuator case of the present embodiment is composed of the gear case (gear housing, case body) 7 which is integrally formed on the external wall surface of the bore wall part 2 of the throttle body 1; and the gear cover (sensor cover, cover) 8 which closes the opening side of this gear case 7 and holds the throttle position sensor. The gear cover 8 is made of thermoplastic resin for establishing electric insulation between the individual terminals of the throttle position sensor described above. Then, the gear cover 8 has a part to be fitted which is fitted to a fitting part formed on the opening side of the gear casing 7, and is mounted onto the opening-side end of the gear case 7 with rivets and screws (not shown).

Incidentally, as shown in FIGS. 2 and 3, the bearing support part 16, one of the two bearing support parts 16 and 18, is integrally formed so as to protrude rightward in the diagram from the external wall surface of the bore wall part 2 of the throttle body 1, i.e., the cylindrically-recessed bottom wall surface of the gear case 7, and holds the inner side of the return spring 61 of the coil spring 6. Besides, a plurality of through holes 19 for fasteners such as a fixing bolt and a fastening screw to be inserted through are formed in the outer peripheral portion of the bore wall part 2.

Then, the bottom side of the bear case 7 in the diagram is provided with a motor accommodating part (motor case part) which is hollowed greater than the gear accommodating part (gear case part) shown to the top. Then, a fully-closed position stopper 21 of boss shape, protruding inward is formed at the center of the upper side of the gear case 7 of the throttle body 1 in the diagram. A fully-closed stopper member (adjust screw with an adjustable screw function) 23 having a locking part for the fully-closed stopper part 22 integrally formed on the valve gear 9 to come into contact with when the throttle valve 3 is closed to the fully-closed position is screwed onto this fully-closed position stopper 21.

In addition, an intermediate position stopper (also referred to as a body hook or a default stopper) 24 of boss shape, protruding inward is formed on the left side of the gear case 7 of the throttle body 1 in the diagram. Screwed into this intermediate position stopper 24 is an intermediate stopper member (adjust screw with an adjustable screw function) 25 which has a locking part for holding or locking the throttle valve 3 at a predetermined intermediate position (intermediate stopper position) between the fully-closed position and the fully-open position mechanically by utilizing the biasing forces of the return spring 61 and the default spring 62 of the coil spring 6 in respective different directions when the supply of an electric current to the drive motor 5 is interrupted for any reason.

Here, a fully-open position stopper 29 of boss shape, protruding inward is formed on the inner peripheral portion of the gear case 7 opposite from the intermediate position stopper 24. This fully-open position stopper 29 is configured so that a fully-open stopper part 26 integrally formed on the valve gear 9 comes into contact when the throttle valve 3 is opened to the fully-open position. A first locking part 27 for locking the one end of the return spring 61 of the coil spring 6 is integrally formed on the external wall surface of the bore wall part 2 of the throttle body 1, i.e., the cylindrically-recessed bottom wall surface of the gear case 7.

The throttle valve 3 is a rotary valve of butterfly shape which is formed into a generally disk-like shape made of metal material or resin material and controls the amount of intake air sucked into the engine. As inserted into a valve insertion hole (not shown) formed in the valve holding part of the throttle shaft 4, the throttle valve 3 is fastened and fixed to the throttle shaft 4 by using fasteners 28 such as a fastening screw. This can integrate the throttle valve 3 and the throttle shaft 4 for integral rotation.

The throttle shaft 4 is formed into a round-rod shape out of metal material, and is rotatably or slidably supported by the bearing support parts 16 and 18 at both ends. Then, the rotor 10, which is one of the components of the throttle position sensor and is insert-molded inside the valve gear 9, one of the components of the geared reduction device, is caulked and fixed to the right end of the throttle shaft 4 in the diagram.

The drive motor 5 is an electric actuator (driving source) which is integrally connected to motor energizing terminals embedded in the gear case 7 and the gear cover 8 and has a motor shaft 36 for rotating in the direction of normal rotation or in the direction of reverse rotation when energized. This drive motor 5 is composed of: a field including a yoke 31 which is made of iron type metal material (magnetic material) and holds a plurality of permanent magnets 30 on its inner periphery; a bearing case 32 fixed to the right end of this yoke 31 in the diagram by such fixing means as caulking; an armature rotatably supported inside the yoke 31 and the bearing case 32; and brushes 33 for supplying an electric current to this armature.

The armature is a rotor (stator) including: the motor shaft 36 which is rotatably supported by a bearing support part of the yoke 31 via a thrust bearing 34 at its left end in the diagram and is rotatably supported by a bearing support part of the bearing case 32 via a ball bearing 35 at its right end in the diagram; an armature core 38 which is fixed to the periphery of this motor shaft 36 and has an armature coil 37 wound around its outer periphery; and a commutator 39 which is electrically connected with the armature coil 37. The brushes 33 are slidably held in brush holders fixed to the bearing case 32, and are always pressed into sliding contact with the outer periphery of the commutator 39 to be described later by coil springs (not shown).

The reduction gear device is valve driving means for reducing the rotational speed of the drive motor 5 to a predetermined reduction ratio, having a pinion gear 41 fixed to the periphery of the motor shaft 36 of the drive motor 5, an internal reduction gear 42 for meshing with this pinion gear 41 for rotation, and the valve gear 9 for meshing with this intermediate reduction gear 42 for rotation, thereby rotationally driving the throttle valve 3 and the throttle shaft 4 thereof. The pinion gear 41 is a motor gear which is integrally formed into a predetermined shape made of metal material and makes integral rotation with the motor shaft 36 of the drive motor 5.

The intermediate reduction gear 42 is integrally molded into a predetermined shape out of resin material, and is rotatably fitted onto the periphery of a support shaft 44 which makes the rotational center. Then, the intermediate reduction gear 42 is provided with a large-diameter gear 45 for meshing with the pinion gear 41 and a small-diameter gear 46 for meshing with the valve gear 9. Here, the pinion gear 41 and the intermediate reduction gear 42 are torque transmission means for transmitting the torque of the drive motor 5 to the valve gear 9. Moreover, one axial end of the support shaft 44 (the right end in the diagram) is fitted into a concave portion formed in the internal wall surface of the gear cover 8, and the other end (the left end in the diagram) is pressed into and fixed to a concave portion formed in the external wall surface of the bore wall part 2 of the throttle body 1.

As shown in FIGS. 1A through 5B, the valve gear 9 of the present embodiment is integrally molded into a predetermined generally annular shape out of resin material. A gear part 51 for meshing with the small-diameter gear 42 of the intermediate reduction gear 42 is integrally formed on the outer periphery of the valve gear 9. Then, the outer periphery of the valve gear 9 is integrally provided with the fully-closed stopper part 22 serving as a part to be locked which is locked by the fully-closed stopper member 23 when the throttle valve 3 is fully closed. Besides, the fully-open stopper part 26 to be locked by the fully-open position stopper 29 when the throttle valve 3 is fully opened is integrally formed on the outer periphery of the valve gear 9.

In addition, an opener member 52 for making integral rotation with the throttle valve 3 and the throttle shaft 4 and a spring inner periphery guide 53 of cylindrical shape for holding the inner side of the default spring 62 of the coil spring 6 are integrally molded so as to protrude axially leftward in the diagram from a bore-wall-part side of the valve gear 9 (the left side in the diagram). Incidentally, the rotor 10 made of iron type metal material (magnetic material) is insert-molded inside the spring inner periphery guide 53.

The opener member 52 is integrally molded with: a second locking part 54 for locking the other end of the default spring 62 of the coil spring 6; an engaging part 55 for making detachable engagement with the U-shaped hook part 63, or the coupling portion between the return spring 61 and the default spring 62; and a plurality of anti-sideslip guides 56 for restraining further movements of the U-shaped hook part 63 of the coil spring 6 in the axial directions (the horizontal directions in the diagram).

The spring inner periphery guide 53 is arranged to fall generally on the same axis as that of the bearing support part 16 for supporting the inner side of the return spring 61 of the coil spring 6, have generally the same diameter, and be opposed to the bearing support part 16. The spring inner periphery guide 53 holds the inner side of the coil spring 6 at between the return spring 61 near the U-shaped hook part 63 of the coil spring 6 and near the other end of the default spring 62.

Then, the outer periphery of the spring inner periphery guide 53 is provided with a plurality (in this example, five to nine) groove portions (concave portions) 57 as abrasive dust removing means for removing abrasive dust occurring from the spring inner periphery guide 53 of the valve gear 9 for making sliding contact with the default spring 62 of the coil spring 6 (for example, resin abrasive dust) or abrasive dust occurring from the default spring 62 of the coil spring 6 itself because of sliding contact with the spring inner periphery guide 53 of the valve gear 9 (for example, metal abrasive dust), at least from the sliding contact portion with the default spring 62 of the coil spring 6.

The plurality of groove portions 57 have a predetermined axial length in the outer periphery of the spring inner periphery guide 53, and have a predetermined groove width (dimension a) and a predetermined groove depth (dimension d). The groove portions 57 are arranged at circumferential regular intervals (for example, intervals of dimension b) only in the sliding contact portion of the spring inner periphery guide 53 with the default spring 62 of the coil spring 6 (for example, a range narrower than the range provided with the groove portions). Moreover, the plurality of groove portions 57 have edge portions capable of rubbing the inner periphery of the default spring 62 to scrape off abrasive dust from the inner periphery of the default spring 62 at the time of sliding friction in relative rotation (edge portions formed on both sides of the opening sides of the groove portions 57). Incidentally, the designed size and number of the plurality of groove portions 57 may be changed freely according to the amount of production of abrasive dusts (for example, resin abrasive dust and metal abrasive dust) produced by the sliding friction between the coil spring 6 and the valve gear 9 resulting from the relative movement between the default spring 62 of the coil spring 6 and the spring inner periphery guide 53 of the valve gear 9.

Here, the coil spring 6 of the present embodiment is a single spring of coil form in which the return spring 61 and the default spring 62 are integrated and one end of the return spring 61 and the other end of the default spring 62 are wound in different directions. Then, the coupling portion between the return spring 61 and the default spring 62 is provided with the U-shaped hook part 63 to be held by the intermediate stopper member 25 when the supply of the electric power to the drive motor 5 is interrupted for any reason.

The return spring 61 is a return spring which is a coiled round bar of spring steel and has the return spring function of biasing the throttle valve 3 via the opener member 52 in the direction of returning from the fully-open position to the intermediate position. Moreover, the default spring 62 is a default spring which is a coiled round bar of spring steel and has the opener spring function of biasing the throttle valve 3 via the opener member 52 in the direction of returning from the fully-closed position to the intermediate position.

Incidentally, the one end of the return spring 61 is provided with a spring-body-side hook (first part to be locked) 64 to be locked or held by the first locking part 27 which is integrally formed on the external wall surface of the bore wall part 2 of the throttle body 1. Besides, the other end of the default spring 62 is provided with a spring-gear-side hook (second part to be locked) 65 to be locked or held by the second locking part 54 of the opener member 52.

[Operation of the Embodiment]

Next, the operation of the electronically controlled throttle control apparatus of the present embodiment will be described briefly with reference to FIGS. 1A through 5B.

Description will be given of the operation for situations where the throttle valve 3 is opened from the intermediate position while the electronically controlled throttle control apparatus is in a normal state. When the operator (driver) steps down the accelerator pedal, the accelerator opening sensor inputs the accelerator opening signal to the ECU. Then, the ECU energizes the drive motor 5 so that the throttle valve 3 comes to a predetermined opening, and the motor shaft 36 of the drive motor 5 rotates. Then, the torque of the drive motor 5 is transmitted to the pinion gear 41 and the intermediate reduction gear 42.

Here, the engaging part 55 of the opener member 52 presses the U-shaped hook part 63 formed at the coupling portion between the return spring 61 and the default spring 62 of the coil spring 6, against the biasing force of the return spring 61 having the return spring function. Here, as the valve gear 9 rotates in the opening direction, the return spring 61 having the spring-body-side hook 64 locked or held by the first locking part 27 integrally formed on the external wall surface of the bore wall part 2 of the throttle body 1 undergoes a biasing force for biasing the throttle valve 3 via the opener member 52 in the direction of returning from the fully-open position to the intermediate position.

This rotates the valve gear 9, so that the throttle shaft 4 is rotated by a predetermined rotation angle and the throttle valve 3 is rotationally driven in the direction of opening from the intermediate position toward the fully-open position (opening direction). The biasing force of the default spring 62 is not involved in this rotation of the throttle valve 3 in the opening direction, and the opener member 52 remains sandwiched between the coupling-portion-side end of the default spring 62 and the spring-gear-side hook 65.

Description will be given of the operation for situations where the throttle valve 3, reversely, is closed from the intermediate position while the electronically controlled throttle control apparatus in a normal state. When the driver releases the accelerator pedal, the motor shaft 36 of the drive motor 5 rotates in the opposite direction, and the throttle valve 3, the throttle shaft 4, and the valve gear 9 also rotate in the opposite direction. Here, the second locking part 54 of the opener member 52 presses the spring-gear-side hook 65 of the default spring 62 against the biasing force of the default spring 62. Here, as the valve gear 9 rotates in the closing direction, the default spring 62 having the spring-gear-side hook 65 locked or held by the second latch part 54 of the opener member 52 undergoes a biasing force for biasing the throttle valve 3 via the opener member 52 in the direction of returning from the fully-closed position to the intermediate position.

Consequently, the throttle shaft 4 is rotated by a predetermined rotation angle, and the throttle valve 3 is rotationally driven in the direction of closing from the intermediate position toward the fully-closed position (i.e., in the closing direction opposite to the opening direction of the throttle valve 3). Then, the fully-closed stopper part 22 integrally formed on the outer periphery of the valve gear 9 comes into contact with the fully-closed stopper member 23 to hold the throttle valve 3 in the fully-closed position. The biasing force of the return spring 61 is not involved in this rotation of the throttle valve 3 in the closing direction. Incidentally, the directions of the current to be passed through the drive motor 5 are reverse to each other across the intermediate position.

Now, description will be given of the operation of the electronically controlled throttle control apparatus when the supply of the current to the drive motor 5 is interrupted for any reason. Here, with the opener member 52 sandwiched between the coupling-portion-side end of the default spring 62 and the spring-gear-side hook 65, the engaging part 55 of the opener member 52 is brought into contact with the U-shaped hook part 63 of the coil spring 6 by the return spring function of the return spring 61, or the biasing force for biasing the throttle valve 3 via the opener member 52 in the direction of returning from the fully-open position to the intermediate position, and the opener spring function of the default spring 62, or the biasing force for biasing the throttle valve 3 via the opener member 52 in the direction of returning from the fully-closed position to the intermediate position. Consequently, the throttle valve 3 is held in the intermediate position with reliability, allowing evacuation drive when the supply of the current to the drive motor 5 is interrupted for any reason.

[Characteristics of the Embodiment]

With the objectives of reducing the parts count of the opener mechanism for simplified configuration and improving the opening position accuracy of the throttle valve 3 at the intermediate position, the electronically controlled throttle control apparatus of the present embodiment adopts the single spring structure of coil form in which the coupling portion between the return spring 61 and the default spring 62 is bent into a generally inverted U-shape to form the U-shaped hook part 63 to be fixed by the intermediate position stopper 24 (intermediate stopper member 25) fixed to the throttle body 1, and both ends are wound in different directions.

Here, in the case of opening the throttle valve 3 from the intermediate position, the spring-body-side hook 64 on the side of the bore wall part 2 of the throttle body 1 is locked or held by the first locking part 27 of the bore wall part 2 of the throttle body 1, and the U-shaped hook part 63 of the coil spring 6 rotates with the spring-gear-side hook 65 so that the return spring 61 generates the biasing force for biasing the throttle valve 3 via the opener member 52 in the direction of returning from the fully-open position to the intermediate position, in which time the bearing support part 16 integrally formed on the bore wall part 2 of the throttle body 1 for holding the inside of the return spring 61 of the coil spring 6 makes no large relative movement with respect to the inner periphery of the return spring 61 of the coil spring 6. Here, since the U-shaped hook part 63 of the coil spring 6 operates integrally with the engaging part 55 and the plurality of anti-sideslip guides 56 of the opener member 52 integrally formed on the valve gear 9, there occurs no relative movement between the U-shaped hook part 63 and the opener member 52.

Now, in the case of closing the throttle valve 3 from the intermediate position, the U-shaped hook part 63 of the coil spring 6 is fixed by the locking part of the intermediate stopper member (body hook) 25 fixed to the throttle body 1, and the opener member 52 rotates with the spring-gear-side hook 65 so that the default spring 62 generates the biasing force for biasing the throttle valve 3 via the opener member 52 in the direction of returning from the fully-closed position to the intermediate position, in which time the spring inner periphery guide 53 for holding the inside of the default spring 62 of the coil spring 6 makes a large relative movement with respect to the inner periphery of the default spring 62 of the coil spring 6.

Consequently, when the throttle valve 3 is closed from the intermediate position, the throttle valve 3 can malfunction due to the occurrence of a large sliding resistance during the relative movement between the outer periphery of the spring inner periphery guide 53 of the valve gear 9 and the inner periphery of the default spring 62 of the coil spring 6. Here, the sliding friction between the outer periphery of the spring inner periphery guide 53 and the inner periphery of the default spring 62 causes abrasive dust (for example, resin abrasive dust) from the spring inner periphery guide 53 in sliding contact with the default spring 62. In addition, the default spring 62 itself produces abrasive dust (for example, metal abrasive dust) because of the sliding contact with the spring inner periphery guide 53.

In particular, the abrasive dust can be rubbed firmly against the outer periphery of the spring inner periphery guide 53 or the inner periphery of the default spring 62 due to the sliding friction between the outer periphery of the spring inner periphery guide 53 and the inner periphery of the default spring 62. When abrasive dust is thus rubbed against the surface of the spring inner periphery guide 53 or the default spring 62, the spring inner periphery guide 53 or the default spring 62 gets warped at the surface, giving rise to the problem that the sliding resistance during the relative movement between the outer periphery of the spring inner periphery guide 53 and the inner periphery of the default spring 62, i.e., the sliding resistance) ascribable to the intervention of abrasive dust between the outer periphery of the spring inner periphery guide 53 and the inner periphery of the default spring 62 of the coil spring 6 is made even greater to promote further malfunction of the throttle valve 3.

Then, in the electronically controlled throttle control apparatus of the present embodiment, the outer periphery of the spring inner periphery guide 53 is provided with the plurality of groove portions 57 as the abrasive dust removing means for removing the foregoing abrasive dust at least from the sliding contact portion between the outer periphery of the spring inner periphery guide 53 and the inner periphery of the default spring 62 (for example, a range narrower than the range provided with the groove portions). Consequently, at the time of sliding friction resulting from the relative movement between the outer periphery of the spring inner periphery guide 53 and the inner periphery of the default spring 62, the individual edge portions of the plurality of groove portions 57 can rub the inner periphery of the default spring 62 to scrape off abrasive dust from the inner periphery of the default spring 62.

Besides, the foregoing abrasive dust can be actively captured (swept) into the plurality of groove portions 57 formed in the outer periphery of the spring inner periphery guide 53. Consequently, the abrasive dust occurring from the spring inner periphery guide 53 or the abrasive dust occurring from the default spring 62 itself due to the sliding friction between the outer periphery of the spring inner periphery guide 53 and the inner periphery of the default spring 62 can be removed from the sliding contact portion (sliding contact surface) between the outer periphery of the spring inner periphery guide 53 and the inner periphery of the default spring 62.

This makes it difficult for abrasive dust to lie in the sliding contact portion (sliding contact surface) between the outer periphery of the spring inner periphery guide 53 and the inner periphery of the default spring 62, so that the foregoing abrasive dust becomes less likely to be rubbed against the outer periphery of the spring inner periphery guide 53 or the surface of the default spring 62 at the time of abrasive friction resulting from the relative movement between the outer periphery of the spring inner periphery guide 53 and the inner periphery of the default spring 62. It is therefore possible to suppress the foregoing deterioration in the sliding resistance of the sliding contact portion during the relative movement between the outer periphery of the spring inner periphery guide 53 and the inner periphery of the default spring 62, i.e., deterioration of the sliding resistance ascribable to the intervention of the abrasive dust in the sliding contact portion between the outer periphery of the spring inner periphery guide 53 and the inner periphery of the default spring 62.

As a result, the throttle valve 3, the throttle shaft 4, and the valve gear 9 can be operated smoothly with the effect that the occurrence of malfunction of the throttle valve 3, the throttle shaft 4, and the valve gear 9 in closing the throttle valve 3 from the intermediate position can be reduced significantly, along with the effects of reducing the parts count for simplified configuration and improving the opening position accuracy of the throttle valve 3 at the intermediate position. There is also provided the effect that the default spring 62 of the coil spring 6 and the spring inner periphery guide 53 of the valve gear 9 can be improved greatly in durability.

In addition, the foregoing abrasive dust can be captured (swept) into the plurality of groove portions 57 to prevent the abrasive dust from being scattered from the sliding contact portion (sliding contact surface) between the outer periphery of the spring inner periphery guide 53 and the inner periphery of the default spring 62 (for example, toward the gear meshing part of the geared reduction device). As a result, no abrasive dust will be scattered into the gear case 7 which rotatably accommodates the individual gears constituting the reduction gear device, and it becomes less likely for abrasive dust to adhere to the gear meshing part of the reduction gear device. Consequently, it is also possible to avoid malfunction of the throttle valve 3 and the throttle shaft 4, and malfunction of the individual gears constituting the reduction gear device for transmitting the rotational output of the drive motor 5 to the throttle valve 3 and the throttle shaft 4.

[Configuration of the Second Embodiment]

Figure 6A:
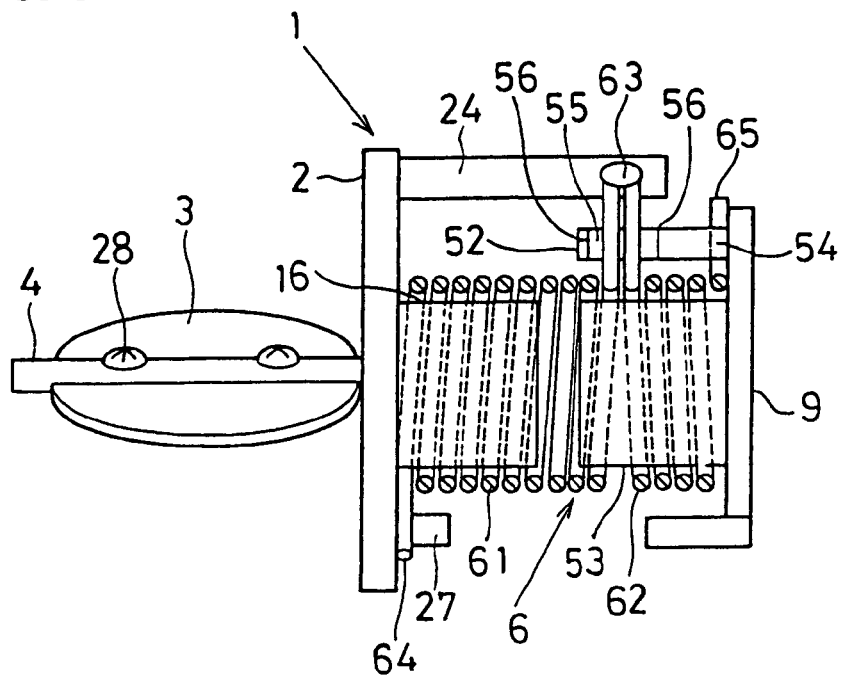
FIGS. 6A and 6B are explanatory diagrams of a structure of an electronically controlled throttle control apparatus according to a second embodiment of the present invention.
Figure 6B:
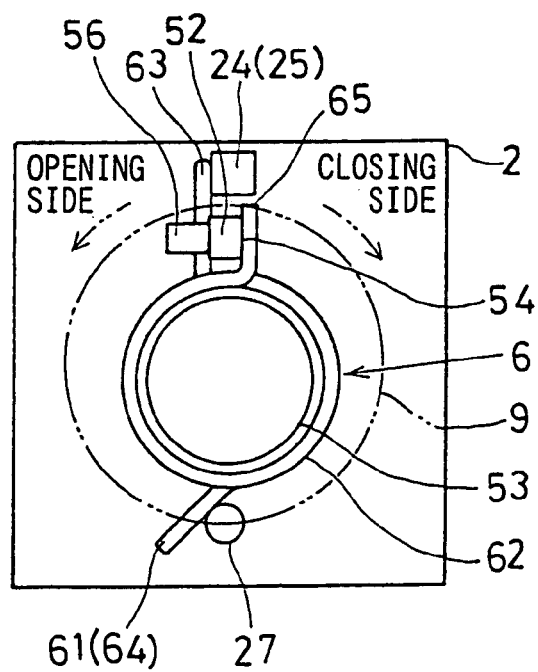
Figure 7A:
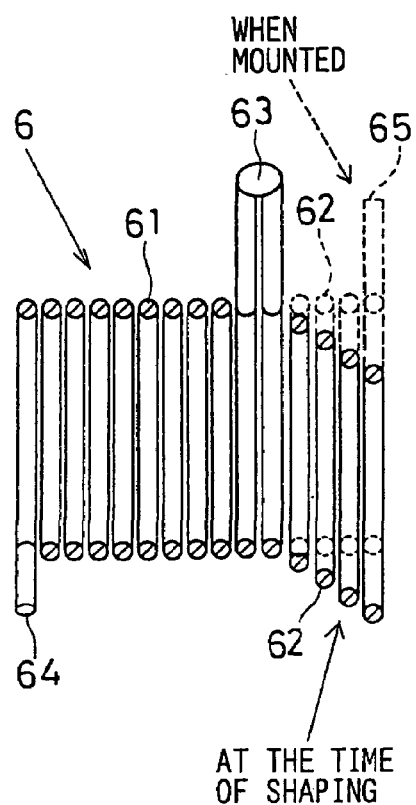
FIG. 7A is a side view of a single coil spring.
Figure 7B:
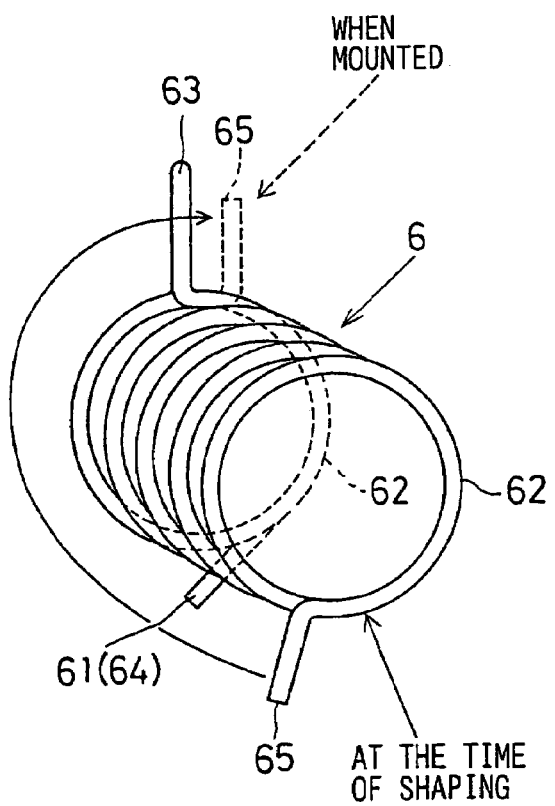
FIG. 7B is a side view of the single coil spring according to a second embodiment of the present invention.
Figure 8A:
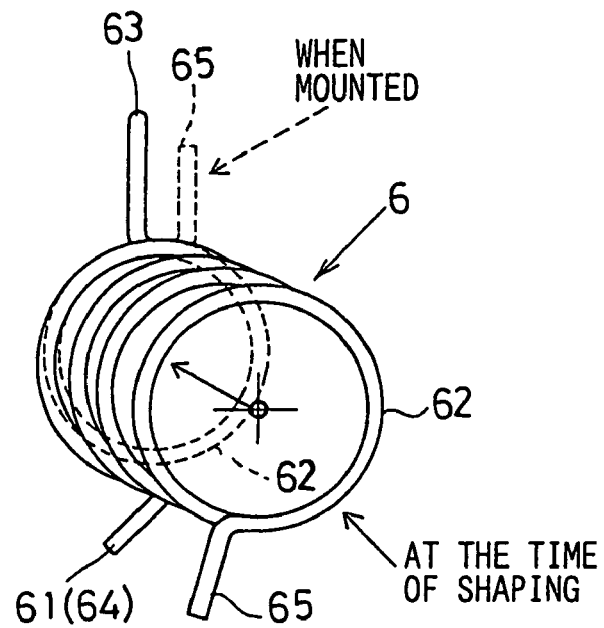
FIG. 8A is a front view of the single coil spring according to a second embodiment of the present invention.
Figure 8B:
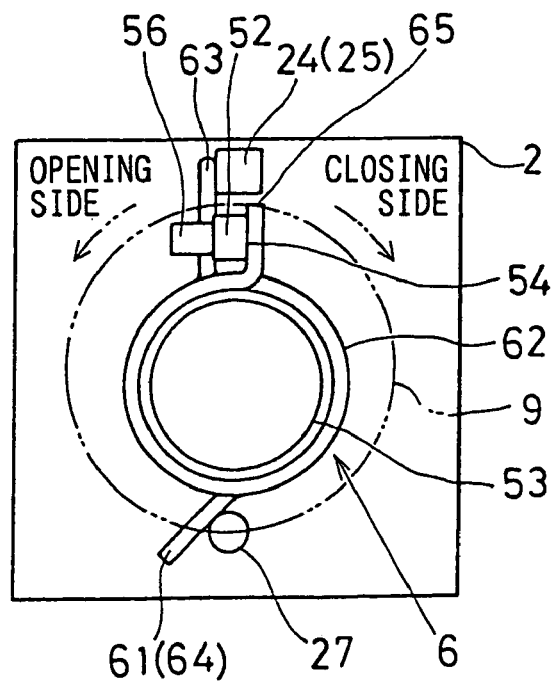
FIG. 8B is an explanatory diagram of an essential structure of the electronically controlled throttle control apparatus according to a second embodiment of the present invention.

FIGS. 2, 3, 4, 6A, 6B, 7A, 7B, 8A, and 8B show a second embodiment of the present invention. FIGS. 6A and 6B show a diagram of a structure of an electronically controlled throttle control apparatus. FIG. 2 is a diagram showing the overall structure of the electronically controlled throttle control apparatus. FIG. 3 is a diagram showing individual components including a drive motor and a geared reduction device constituted inside a gear case which is integrally formed on an external wall surface of a throttle body. FIG. 4 is a diagram showing a general structure of the electronically controlled throttle control apparatus.

The electronically controlled throttle control apparatus of the present embodiment is an intake control apparatus for an internal combustion engine, comprising: a throttle body 1 which forms an intake duct to each cylinder of the internal combustion engine (engine); a throttle valve 3 which is openably/closably accommodated in a cylindrical bore wall part 2 of this throttle body 1, and adjusts the amount of intake air into the engine; a throttle shaft 4 which holds this throttle valve 3 and is rotatably supported by bearing support parts of the bore wall part 2; a drive motor (actuator, valve driving means) which drives the throttle valve 3 and the throttle shaft 4 rotationally in a fully-open direction or a fully-closed direction; a geared reduction device (power transmission device) which transmits the rotational output of the drive motor 5 to the throttle valve 3 and the throttle shaft 4; and an engine control device (engine control unit: hereinafter, referred to as ECU) which electronically controls the drive motor 5 based on the amount of accelerator operation.

As shown in FIGS. 2, 3, 4 6A, and 6B, the electronically controlled throttle control apparatus of the present embodiment also comprises a single coil spring (valve biasing means) 6 in which a first spring part (hereinafter, referred to as return spring) 61 having a return spring function and a second spring part (hereinafter, referred to as default spring) 62 having an opener spring function are integrated to bias the throttle valve 3 in the fully-closed direction or the fully-open direction. This single coil spring 6 is mounted between the external wall surface (the right end in the diagram) of the bore wall part 2 of the throttle body 1, i.e., the cylindrically-recessed bottom wall surface of a gear case 7 and the left end of a valve gear 9 in the diagram, and is given a single spring structure of coil form in which the coupling portion (the middle) between the return spring 61 and the default spring 62 is bent into an generally inverted U-shape to form a U-shaped hook part 63 to be held by an intermediate stopper member 25 and both ends are wound in different directions.

Then, the electronically controlled throttle control apparatus controls the rotational speed of the engine by controlling the amount of intake air flowing into the engine based on the degree to which the accelerator pedal (not shown) of the vehicle is stepped down (the amount of accelerator operation). Incidentally, the ECU is connected with an accelerator opening sensor (not shown) for converting the degree of stepping of the accelerator pedal into an electric signal (accelerator opening signal) and outputting to the ECU how far the accelerator pedal is stepped down.

The electronically controlled throttle control apparatus also comprises a throttle position sensor for converting the opening of the throttle valve 3 into an electric signal (throttle opening signal) and outputting to the ECU how far the throttle valve 3 is opened. This throttle position sensor is composed of: a rotor 10 fixed to the right end of the throttle shaft 4 in the diagram by such fixing means as caulking; permanent magnets 11 of split type (generally rectangular shape) as a magnetic field generating source; yokes (magnetic bodies) 12 of split type (generally arcuate shape) to be magnetized by these permanent magnets 11; a Hall device 13 integrally arranged on the side of a gear cover 8 so as to be opposed to the permanent magnets 11 of split type; terminals (not shown) made of a conductive metal sheet for establishing electric connection between this Hall device 13 and the ECU outside; and a stator 14 made of iron type metal material (magnetic material) for focusing a magnetic flux onto the Hall device 13.

The permanent magnets 11 of split type and the yokes 12 of split type are fixed, by using an adhesive or the like, to the inner periphery of the rotor 10 which is insert-molded in the valve gear 9, a component of the geared reduction device. Incidentally, the permanent magnets 11 of split type are arranged between the two adjoining yokes 12. The permanent magnets 11 of split type according to the present embodiment are arranged so that the same poles of the permanent magnets of generally rectangular shape, polarized in the vertical directions in FIG. 3 (the N poles upward in the diagram, the S poles downward in the diagram), fall on the same sides. The Hall device 13 corresponds to a detecting device of noncontact type, and is arranged to face the inner side of the permanent magnets 11 so that it generates an electromotive force in response to the magnetic fields of the N poles or the S poles when the magnetic fields occur on the sensing plate (a positive potential is generated when the magnetic fields of the N poles occur, and a negative potential is generated when the magnetic fields of the S poles occur).

The throttle body 1 is an apparatus which is made of metal material such as aluminum die-cast and holds the throttle valve 3 rotatably in the direction of rotation from the fully-closed position through the fully-open position inside the intake duct having a generally circular section formed in the bore wall part 2, and is fastened and fixed to the intake manifold of the engine by using fasteners (not shown) such as a fixing bolt and a fastening screw. This throttle body 1 is provided with: a bearing supporting part 16 of cylindrical shape for rotatably supporting the right end (one end) of the throttle shaft 4 in the diagram via a ball bearing (bearing) 15; a bearing support part 18 of cylindrical shape for rotatably supporting the left end (the other end) of the throttle shaft 4 in the diagram rotatably via a dry bearing (bearing) 17; and an actuator case for accommodating the drive motor 5 and the geared reduction device.

Here, the actuator case of the present embodiment is composed of: the gear case (gear housing, case body) 7 which is integrally formed on the external wall surface of the bore wall part 2 of the throttle body 1; and the gear cover (sensor cover, cover) 8 which closes the opening side of this gear case 7 and holds the throttle position sensor. The gear cover 8 is made of thermoplastic resin for establishing electric insulation between the individual terminals of the throttle position sensor described above. Then, the gear cover 8 has a part to be fitted which is fitted to a fitting part formed on the opening side of the gear casing 7, and is mounted on the opening-side end of the gear case 7 with rivets and screws (not shown).

Incidentally, as shown in FIGS. 2 and 3, the bearing support part 16, one of the two bearing support parts 16 and 18, is integrally formed so as to protrude rightward in the diagram from the external wall surface of the bore wall part 2 of the throttle body 1, i.e., the cylindrically-recessed bottom wall surface of the gear case 7, and holds the inner side of the return spring 61 of the coil spring 6. Besides, a plurality of through holes 19 for the fasteners such as a fixing bolt and a fastening screw to be inserted through are formed in the outer peripheral portion of the bore wall part 2.

Then, the bottom side of the gear case 7 in the diagram is provided with a motor accommodating part (motor case part) which is hollowed greater than the gear accommodating part (gear case part) shown to the top in the diagram.

Then, a fully-closed position stopper 21 of boss shape, protruding inward is formed at the center of the top side of the gear case 7 of the throttle body 1 in the diagram. A fully-closed stopper member (adjust screw with an adjustable screw function) 23 having a locking part for the fully-closed stopper part 22 integrally formed on the valve gear 9 to come into contact with when the throttle valve 3 is closed to the fully-closed position is screwed into this fully-closed position stopper 21.

In addition, an intermediate position stopper (also referred to as a body hook or a default stopper) 24 of boss shape, protruding inward is formed on the left side of the gear case 7 of the throttle body 1 in the diagram. Screwed into this intermediate position stopper 24 is an intermediate stopper member (adjust screw with an adjustable screw function) 25 which has a locking part for holding or locking the throttle valve 3 in a predetermined intermediate position (intermediate stopper position) between the fully-closed position and the fully-open position mechanically by utilizing the biasing forces of the return spring 61 and default spring 62 of the coil spring 6 in respective different directions when the supply of the electric current to the drive motor 5 is interrupted for any reason.

Here, a fully-open position stopper 29 of boss shape, protruding inward is formed on the inner peripheral portion of the gear case 7 opposite from the intermediate position stopper 24. This fully-open position stopper 29 is configured so that a fully-open stopper part (not shown) integrally formed on the valve gear 9 comes into contact when the throttle valve 3 is opened to the fully-open position. A first locking part (body-side hook) 27 for locking one end of the return spring 61 of the coil spring 6 is integrally formed on the external wall surface of the bore wall part 2 of the throttle body 1, i.e., the cylindrically-recessed bottom wall surface of the gear case 7.

The throttle valve 3 is a rotary valve of butterfly shape which is formed into a generally disk-like shape out of metal material or resin material and controls the amount of intake air sucked into the engine. As inserted into a valve insertion hole (not shown) formed in the valve holding part of the throttle shaft 4, the throttle valve 3 is fastened and fixed to the throttle shaft 4 by using fasteners 28 such as a fastening screw. This can integrate the throttle valve 3 and the throttle shaft 4 for integral rotation.

The throttle shaft 4 is formed into a round-rod shape out of metal material, and is rotatably or slidably supported by the bearing, support parts 16 and 18 at both ends. Then, the rotor 10, which is one of the components of the throttle position sensor and is insert-molded inside the valve gear 9, one of the components of the geared reduction device, is caulked and fixed to the right end of the throttle shaft 4 in the diagram.

The drive motor 5 is an electric actuator (driving source) which is integrally connected to motor energizing terminals embedded in the gear case 7 and the gear cover 8, and has a motor shaft 36 to rotate in the direction of normal rotation or in the direction of reverse rotation when energized. This drive motor 5 is composed of: a field including a yoke 31 made of iron type metal material (magnetic material) which holds a plurality of permanent magnets 30 on its inner periphery; a bearing case 32 fixed to the right end of this yoke 31 in the diagram by such fixing means as caulking; an armature rotatably supported inside the yoke 31 and the bearing case 32; and brushes 33 for supplying an electric current to this armature.

The armature is a rotor (stator) including: the motor shaft 36 which is rotatably supported by a bearing support part of the yoke 31 via a thrust bearing 34 at its left end in the diagram and is rotatably supported by a bearing support part of the bearing case 32 via a ball bearing 35 at its right end in the diagram; an armature core 38 which is fixed to the periphery of this motor shaft 36 and has an armature coil 37 wound around its outer periphery; and a commutator 39 which is electrically connected with the armature coil 37. The brushes 33 are slidably held in brush holders fixed to the bearing case 32, and are always pressed into sliding contact with the outer periphery of the commutator 39 to be described later by coil springs (not shown).

The reduction gear device is valve driving means for reducing the rotational speed of the drive motor 5 to a predetermined reduction ratio, having a pinion gear 41 fixed to the periphery of the motor shaft 36 of the drive motor 5, an intermediate reduction gear 42 for meshing with this pinion gear 41 for rotation, and the valve gear 9 for meshing with this intermediate reduction gear 42 for rotation, thereby driving the throttle valve 3 and the throttle shaft 4 rotationally. The pinion gear 41 is a motor gear which is integrally formed into a predetermined shape out of metal material and makes integral rotation with the motor shaft 36 of the drive motor 5.

The intermediate reduction gear 42 is integrally molded into a predetermined shape out of resin material, and is rotatably fitted onto the periphery of a support shaft 44 which makes the rotational center. Then, the intermediate reduction gear 42 is provided with a large-diameter gear 45 for meshing with the pinion gear 41 and a small-diameter gear 46 for meshing with the valve gear 9. Here, the pinion gear 41 and the intermediate reduction gear 42 are torque transmission means for transmitting the torque of the drive motor 5 to the valve gear 9. Moreover, one axial end of the support shaft 44 (the right end in the diagram) is fitted into a concave portion formed in the internal wall surface of the gear cover 8, and the other end (the left end in the diagram) is pressed into and fixed to a concave portion formed in the external wall surface of the bore wall part 2 of the throttle body 1.

As shown in FIGS. 2, 3, 4, 6A and 6B, the valve gear 9 of the present embodiment is integrally molded into a predetermined generally annular shape out of resin material. A gear part 51 for meshing with the small-diameter gear 42 of the intermediate reduction gear 42 is integrally formed on the outer periphery of the valve gear 9. Then, the outer periphery of the valve gear 9 is integrally provided with the fully-closed stopper part 22 as the part to be locked which is locked by the fully-closed stopper member 23 when the throttle valve 3 is fully closed. Besides, the fully-open stopper part as the part to be locked which is locked by the fully-open position stopper 29 when the throttle valve 3 is opened to the fully-open position is integrally formed on the outer periphery of the valve gear 9.

In addition, an opener member 52 which makes integral rotation with the throttle valve 3 and the throttle shaft 4 and is biased by the default spring 62 of the coil spring 6 from the fully-closed position toward the intermediate position (in a fully-opening direction), and a spring inner periphery guide 53 of cylindrical shape which holds the inner side of the default spring 62 of the coil spring 6 are integrally molded so as to protrude axially leftward in the diagram from a bore-wall-part side of the valve gear 9 (the left end in the diagram). Incidentally, the rotor 10 made of iron type metal material (magnetic material) is insert-molded inside the spring inner periphery guide 53.

The opener member 52 is integrally molded with: a second locking part 54 for locking the other end of the default spring 62 of the coil spring 6; an engaging part 55 for making detachable engagement with the U-shaped hook part 63, or the coupling portion between the return spring 61 and the default spring 62; and a plurality of anti-sideslip guides 56 for restraining further movements of the U-shaped hook part 63 of the coil spring 6 in the axial directions (the horizontal directions in the diagram).

The spring inner periphery guide 53 is arranged to fall generally on the same axis as that of the bearing support part 16 for supporting the inner side of the return spring 61 of the coil spring 6, have generally the same diameter, and be opposed to the bearing support part 16. It holds the inner side of the coil spring 6 at between the return spring 61 near the U-shaped hook part 63 of the coil spring 6 and near the other end of the default spring 62.

Here, as shown in FIGS. 2, 3, 4, 6A, 6B, 7A, 7B, 8A, and 8B, the single coil spring 6 of the present embodiment is a single spring of coil form, mounted between the external wall surface of the bore wall part 2 of the throttle body 1 and the opposed surface of the valve gear 9, in which the return spring 61 and the default spring 62 are integrated and one end of the return spring 61 and the other end of the default spring 62 are wound in different directions. Then, the coupling portion between the return spring 61 and the default spring 62 is provided with the U-shaped hook part 63 to be held by the intermediate stopper member 25 when the supply of the electric power to the drive motor 5 is interrupted for any reason.

The return spring 61 is a first spring which is a coiled round bar of spring steel and has a return spring function of biasing the throttle valve 3 via the opener member 52 in the direction of returning from the fully-open position to the intermediate position (also referred to as default position). Moreover, the default spring 62 is a second spring which is a coiled round bar of spring steel and has an opener spring function of biasing the throttle valve 3 via the opener member 52 in the direction of returning from the fully-closed position to the intermediate position.

Incidentally, the one end of the return spring 61 is provided with a spring body-side hook (first part to be locked) 64 to be locked or held by the first locking part 27 integrally formed on the external wall surface of the bore wall part 2 of the throttle body 1. Besides, the other end of the default spring 62 is provided with a spring gear-side hook (second part to be locked) 65 to be locked or held by the second locking part 54 of the opener member 52.

Here, as shown in FIGS. 6A, 6B, 7A, 7B, 8A, and 8B, the single coil spring 6 of the present embodiment has a coil configuration in which the center axis of the default spring 62 is previously decentered (offset) in a direction opposite to that of rotational deformation occurring when the one end of the return spring 61 is mounted on the first locking part 27 of the bore wall part 2 of the throttle body 1 and the other end of the default spring 62 is mounted on the second locking part 54 of the opener member 52 of the valve gear 9.

In addition, the default spring 62 is wound into a coil form reversely to the winding direction (coil direction) of the return spring 61, with the number of turns (the height of the default spring 62 in the direction of the center axis) smaller than the number of turns of the return spring 61 (the height of the return spring 61 in the direction of the center axis). It constitutes, with the return spring 61, a generally regular pitch coil having a generally constant coil outside diameter in the direction of the center axis and a generally constant coil pitch. Moreover, the wire diameter of the default spring 62 is generally the same as the wire diameter of the return spring 61, and the coil outside diameter of the default spring 62 is generally the same as the coil outside diameter of the return spring 61.

[Operation of the Second Embodiment]

Next, the operation of the electronically controlled throttle control apparatus of the present embodiment will be described briefly with reference to FIGS. 2, 3, 4, 6A, 6B, 7A, 7B, 8A, and 8B. Description will be given of the operation for situations where the throttle valve 3 is opened from the intermediate position while the electronically controlled throttle control apparatus is in a normal state. When the operator (driver) steps down the accelerator pedal, the accelerator opening sensor inputs the accelerator opening signal to the ECU. Then, the ECU energizes the drive motor 5 so that the throttle valve 3 comes to a predetermined opening, and the motor shaft 36 of the drive motor 5 rotates. Then, the torque of the drive motor 5 is transmitted to the pinion gear 41 and the intermediate reduction gear 42.

Here, the engaging part 55 of the opener member 52 presses the U-shaped hook part 63 formed at the coupling portion between the return spring 61 and the default spring 62 of the coil spring 6, against the biasing force of the return spring 61 having the return spring function. Here, as the valve gear 9 rotates in the opening direction, the return spring 61 having the spring body-side hook 64 locked or held by the first locking part 27 integrally formed on the external wall surface of the bore wall part 2 of the throttle body 1 undergoes a biasing force for biasing the throttle valve 3 via the opener member 52 from the fully-open position to the intermediate position.

This rotates the valve gear 9, so that the throttle shaft 4 is rotated by a predetermined rotation angle and the throttle valve 3 is rotationally driven in the direction of opening from the intermediate position toward the fully-open position (opening direction). The biasing force of the default spring 62 is not involved in this rotation of the throttle valve 3 in the opening direction, and the opener member 52 remains sandwiched between the coupling-portion-side end of the default spring 62 and the spring gear-side hook 65.

Description will be given of the operation for situations where the throttle valve 3 is closed, reversely, from the intermediate position while the electronically controlled throttle control apparatus is in a normal state. When the driver releases the accelerator pedal, the motor shaft 36 of the drive motor 5 rotates in the opposite direction, and the throttle valve 3, the throttle shaft 4, and the valve gear 9 also rotate in the opposite direction. Here, the second locking part 54 of the opener member 52 presses the spring gear-side hook 65 of the default spring 62 against the biasing force of the default spring 62. Here, as the valve gear 9 rotates in the closing direction, the default spring 62 having the spring gear-side hook 65 locked or held by the second locking part 54 of the opener member 52 undergoes a biasing force for biasing the throttle valve 3 via the opener member 52 from the fully-closed position to the intermediate position.

This rotates the throttle shaft 4 by a predetermined rotation angle, and the throttle valve 3 is rotationally driven in the direction of closing from the intermediate position toward the fully-closed position (i.e., in the closing direction opposite to the opening direction of the throttle valve 3). Then, the fully-closed stopper part 22 integrally molded on the periphery of the valve gear 9 comes into contact with the fully-closed stopper member 23 to hold the throttle valve 3 in the fully-closed position. The biasing force of the return spring 61 is not involved in this rotation of the throttle valve 3 in the closing direction. Incidentally, the directions of the current to be passed through the drive motor 5 are reverse to each other across the intermediate position.

Now, description will be given of the operation of the electronically controlled throttle control apparatus when the supply of the current to the drive motor 5 is interrupted for any reason. Here, with the opener member 52 sandwiched between the coupling-portion-side end of the default spring 62 and the spring gear-side hook 65, the engaging part 55 of the opener member 52 is brought into contact with the U-shaped hook part 63 of the coil spring 6 by the return spring function of the return spring 61, or the biasing force for biasing the throttle valve 3 via the opener member 52 in the direction of returning from the fully-open position to the intermediate position, and the opener spring function of the default spring 62, or the biasing force for biasing the throttle valve 3 via the opener member 52 in the direction of returning from the fully-closed position to the intermediate position. Consequently, the throttle valve 3 is held in the intermediate position with reliability, allowing evacuation drive when the supply of the current to the drive motor 5 is interrupted for any reason.

[Characteristics of the Second Embodiment]

With the objective of reducing the parts count of the opener mechanism for simplified configuration and improving the opening position accuracy of the throttle valve 3 at the intermediate position, the electronically controlled throttle control apparatus of the present embodiment adopts the single spring structure of coil form in which the coupling portion between the return spring 61 and the default spring 62 is bent into a generally inverted U-shape to form the U-shaped hook part 63 to be fixed by the intermediate position stopper 24 (intermediate stopper member 25) which is fixed to the throttle body 1, and both ends are wound in different directions.

Here, in the case of opening the throttle valve 3 from the intermediate position, the spring body-side hook 64 on the side of the bore wall part 2 of the throttle body 1 is locked or held by the first locking part 27 of the bore wall part 2 of the throttle body 1, and the U-shaped hook part 63 of the coil spring 6 rotates with the spring gear-side hook 65 so that the return spring 61 generates the biasing force for biasing the throttle valve 3 via the opener member 52 in the direction of returning from the fully-open position to the intermediate position, in which time the bearing support part 16 integrally formed on the bore wall part 2 of the throttle body 1 for holding the inside of the return spring 61 of the coil spring 6 makes no large relative movement with respect to the inner periphery of the return spring 61 of the coil spring 6. Here, since the U-shaped hook part 63 of the coil spring 6 makes an integral operation with the engaging part 55 and the plurality of anti-sideslip guides 56 of the opener member 52 integrally formed on the valve gear 9, there occurs no relative movement between the U-shaped hook part 63 and the opener member 52.

Besides, in the case of closing the throttle valve 3 from the intermediate position, the U-shaped hook part 63 of the coil spring 6 is fixed by the locking part of the intermediate stopper member (body hook) 25 fixed to the throttle body 1, and the opener member 52 rotates with the spring gear-side hook 65 so that the default spring 62 generates the biasing force for biasing the throttle valve 3 via the opener member 52 in the direction of returning from the fully-closed position to the intermediate position, in which time the spring inner periphery guide 53 for holding the inner side of the default spring 62 of the coil spring 6 makes a large relative movement with respect to the inner periphery of the default spring 62 of the coil spring 6.

Here, in the case of the electronically controlled throttle control apparatus (conventional article) having the single coil spring 100 such as shown in FIGS. 12 to 15B, when the throttle valve 104 is driven from the intermediate position (default position) toward the fully-closed position, the inner periphery (inner side) of the second spring part (default spring) 102 of the single coil spring 100 and the outer periphery of the spring inner periphery guide 108 of the valve gear 111 can make a large relative movement therebetween, causing a large sliding resistance between the outer periphery of the spring inner periphery guide 108 and the inner periphery of the second spring part 102 with possible malfunction of the throttle valve 104 due to the occurrence of the sliding resistance during the relative movement.

That is, when the other end of the second spring part 102 of the single coil spring 100 is set to the gear-side hook 122 formed on the opener member 106 of the valve gear 111 and the U-shaped hook part 103 is set to the engaging part 124 formed on the opener member 106 of the valve gear 111, the coil spring 100, or the second spring part 102 in particular, causes a rotational deformation. This brings the outer periphery of the spring inner periphery guide 108 and the inner periphery of the second spring part 102 into contact with each other as shown in FIGS. 13A, 13B and 15A, 15B, contributing the occurrence of the sliding resistance during the relative movement between the outer periphery of the spring inner periphery guide 108 and the inner periphery of the second spring part 102 in driving the throttle valve 104 from the intermediate position (default position) toward the fully-closed position.

Moreover, if the sliding friction between the outer periphery of the spring inner periphery guide 108 and the inner periphery of the second spring part 102 causes abrasive dust (metal dust or resin dust) and this abrasive dust intervenes in the sliding portion between the outer periphery of the spring inner periphery guide 108 and the inner periphery of the second spring part 102, the abrasive dust is rubbed against the sliding portion because of the sliding friction between the outer periphery of the spring inner periphery guide 108 and the inner periphery of the second spring part 102. This warps the spring inner periphery guide 108 or the second spring part 102 in the surface, causing the problem that the sliding resistance during the relative movement between the outer periphery of the spring inner periphery guide 108 and the inner periphery of the second spring part 102, i.e., the sliding resistance ascribable to the intervention of the abrasive dust between the outer periphery of the spring inner periphery guide 108 and the inner periphery of the second spring part 102 is even deteriorated to promote further malfunction of the throttle valve 104.

Then, the electronically controlled throttle control apparatus of the present embodiment uses the single coil spring 6 having the coil configuration that the center axis of the default spring 62 is previously decentered in a direction opposite to that of rotational deformation occurring when the other end of the default spring 62 is set to the second locking part (gear-side hook) 54 of the opener member 52 of the valve gear 9 and the U-shaped hook part 63 is set to the engaging part 55 of the opener member 52.

That is, the amount of offset (the amount of rotational deformation) of the default spring 62 to occur when the other end of the default spring 62 is set to the second locking part (gear-side hook) 54 of the opener member 52 of the valve gear 9 and the U-shaped hook part 63 is set to the engaging part 55 of the opener member 52 is preloaded to the single coil spring 6 in the opposite direction at the time of shaping. This can reduce the amount of offset of the default spring 62 when the single coil spring 6 is set to the electronically controlled throttle control apparatus.

Consequently, when the single coil spring 6 is set to the electronically controlled throttle control apparatus, as shown in FIGS. 6A, 6B, 7A, 7B, 8A, and 8B, the outer periphery of the spring inner periphery guide 53 integrally formed on the opposed surface of the valve gear 9 (the side opposed to the external wall surface of the bore wall part 2) with the opener member 52 and the inner periphery (inner side) of the default spring 62 form generally concentric circles, so that a generally cylindrical gap can be formed between the outer periphery of the spring inner periphery guide 53 and the inner periphery (inner side) of the default spring 62. That is, the outer periphery of the spring inner periphery guide 53 and the inner periphery of the default spring 62 form no sliding portion therebetween. This allows a significant reduction in sliding resistance during the relative movement in driving the throttle valve 3 from the intermediate position (default position) to the fully-closed position as compared to the conventional articles.

Consequently, the throttle valve 3, the throttle shaft 4, and the valve gear 9 can be operated smoothly, allowing a reduction of the rotational load on the drive motor 5 and miniaturization of the drive motor 5. In addition, there is obtained the effect that the occurrence of malfunction of the throttle valve 3, the throttle shaft 4, and the valve gear 9 in closing the throttle valve 3 from the intermediate position can be reduced significantly, aside from the effects of reducing the parts count for simplified configuration and improving the opening position accuracy of the throttle valve 3 at the intermediate position. Here, even if other parts of the valve gear 9 (such as the tooth portions of the gear part 51, the fully-closed stopper part 22, and the fully-open stopper part) produce abrasive dust, the frictional resistance will not deteriorate since the contact resistance is absent or lower than in the conventional articles.

From the foregoing reasons, the sliding resistance during the relative movement in driving the throttle valve 3 from the intermediate position (default position) toward the fully-closed position can be lowered to reduce the hysteresis of the spring load on the single coil spring 6. This allows improved controllability of the throttle valve 3, the throttle shaft 4, and the valve gear 9 at low engine rotations including the idling operation of a vehicle such as an automobile in particular. Moreover, since the wear of the sliding portion between the outer periphery of the spring inner periphery guide 53 and the inner periphery of the default spring 62 can be avoided as perfectly as possible, secular deterioration of the sliding resistance can be prevented. That is, the default spring 62 of the coil spring 6 and the spring inner periphery guide 53 of the valve gear 9 can be greatly improved in durability, making it possible to provide an electronically controlled throttle control apparatus of high reliability with less secular changes in characteristics.

[Third Embodiment]

Figure 9:
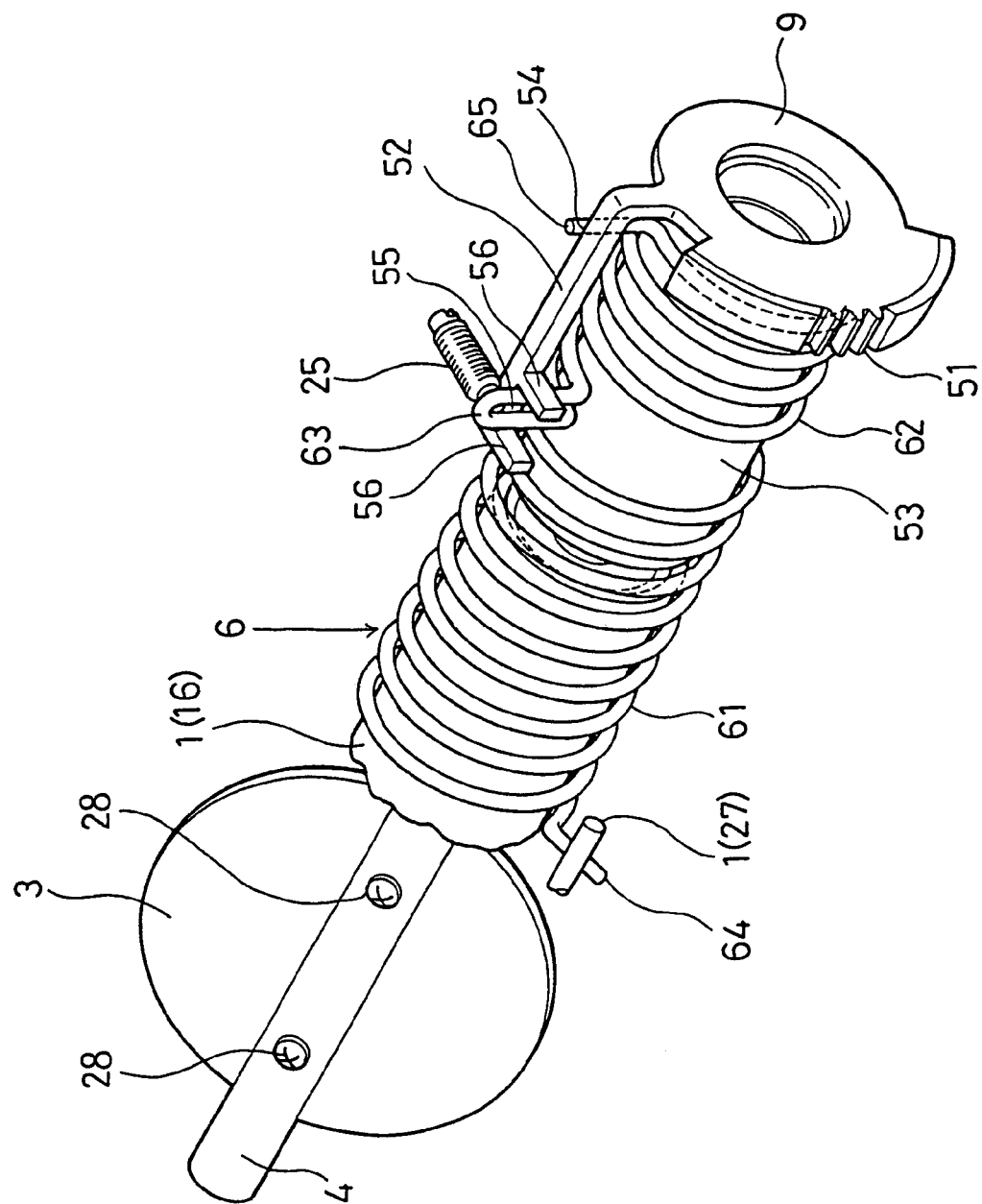
FIG. 9 is a perspective view of the general structure of an electronically controlled throttle control apparatus according to a third embodiment of the present invention.

FIG. 9 is a diagram showing the general structure of an electronically controlled throttle control apparatus, showing a third embodiment of the present invention.

Like the second embodiment, the present embodiment uses the single coil spring 6 having the coil configuration that the center axis of the default spring 62 is previously decentered in a direction opposite to that of rotational deformation occurring when the other end of the default spring 62 is set to the second locking part (gear-side hook)

54 of the opener member 52 of the valve gear 9 and the U-shaped hook part 63 is set to the engaging part 55 of the opener member 52.

Then, the spring body-side hook (first part to be locked) 64, which is the one end of the return spring 61 of the single coil spring 6, is locked by the first locking part (body-side hook) 27 of the throttle body 1. In addition, the spring gear-side hook (second part to be locked) 65, which is the other end of the default spring 62 of the single coil spring 6, is locked by the second locking part 54 of the opener member 52 of the valve gear (rotator) 9.

Then, the U-shaped hook part 63 of the single coil spring 6 is engaged with the engaging part 55 which is formed between the anti-sideslip guides 56 of the opener member 52 of the valve gear 9. Incidentally, the second locking part 54 and the engaging part 55 of the opener member 52 of the valve gear 9, i.e., the spring gear-side hook 65 and the U-shaped hook part 63 of the single coil spring 6 are arranged at a predetermined distance in the axial direction of the spring inner periphery guide 53.

[Fourth Embodiment]

Figure 10:
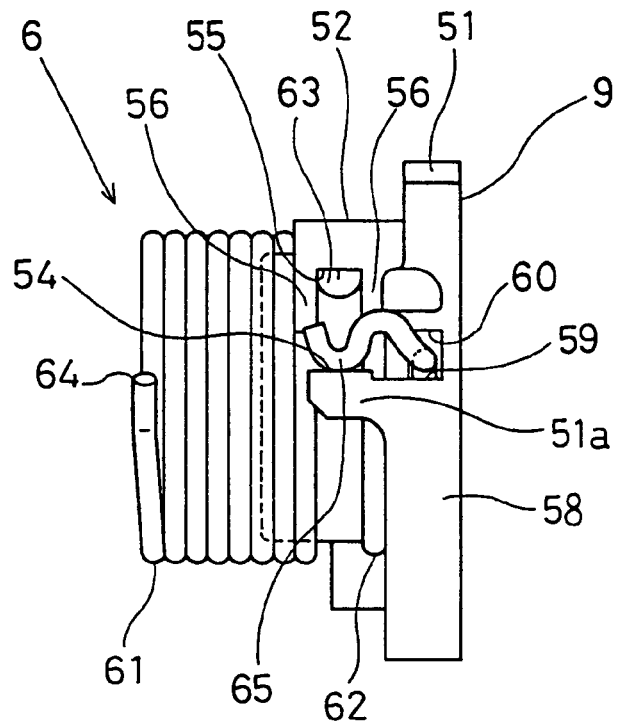
FIG. 10 is a side view of a single coil spring and a valve gear according to a third embodiment of the present invention.
Figure 11:
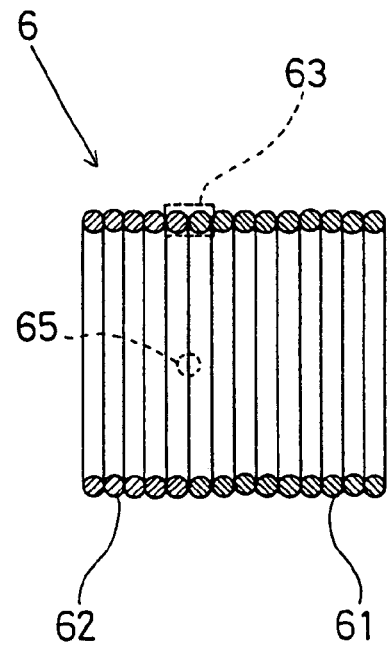
FIG. 11 is a cross-sectional view of the single coil spring according to a fourth embodiment of the present invention.
Figure 12:
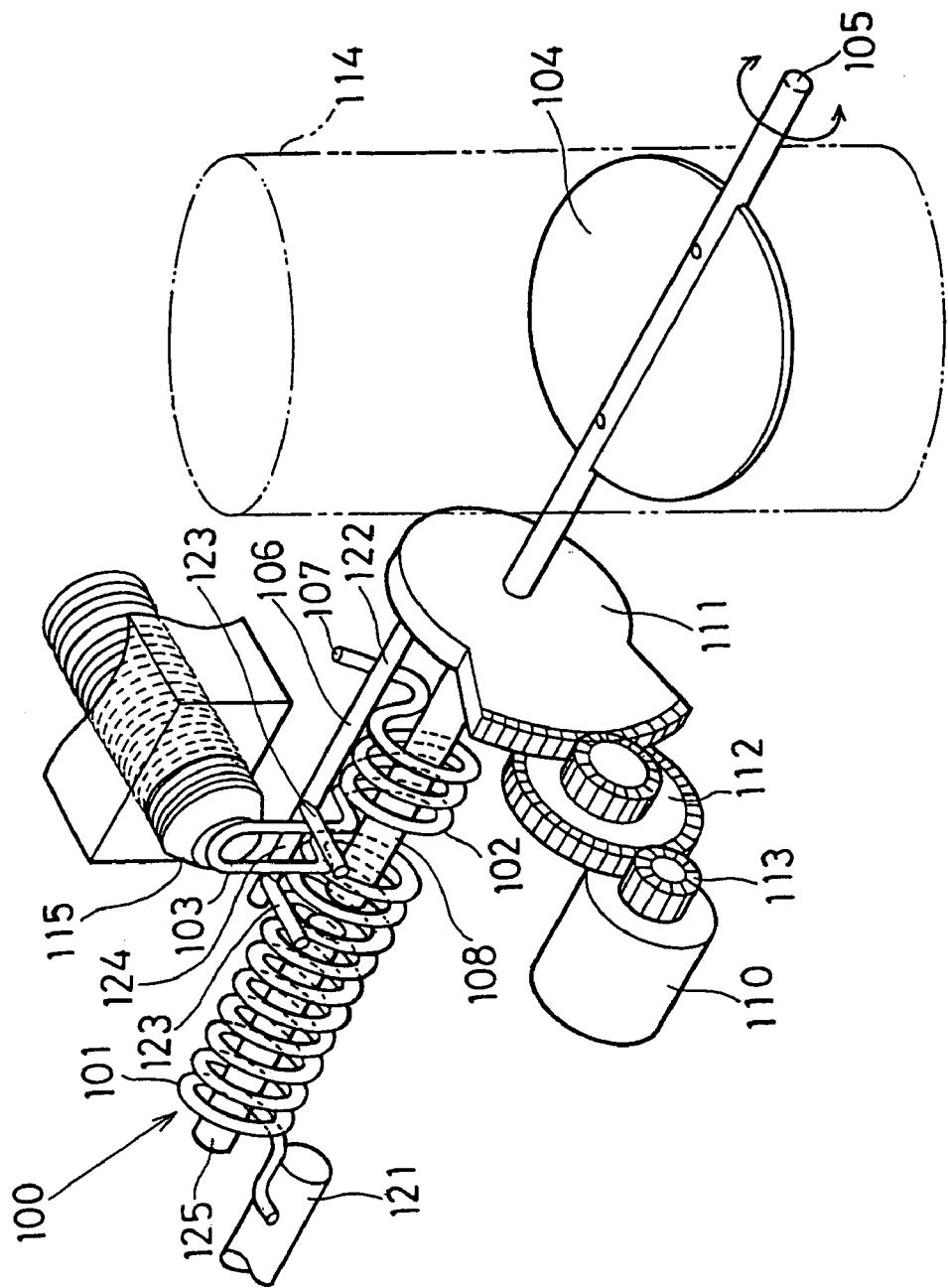
FIG. 12 is a perspective view of the general structure of an electronically controlled throttle control apparatus according to the prior art.
Figure 13A:
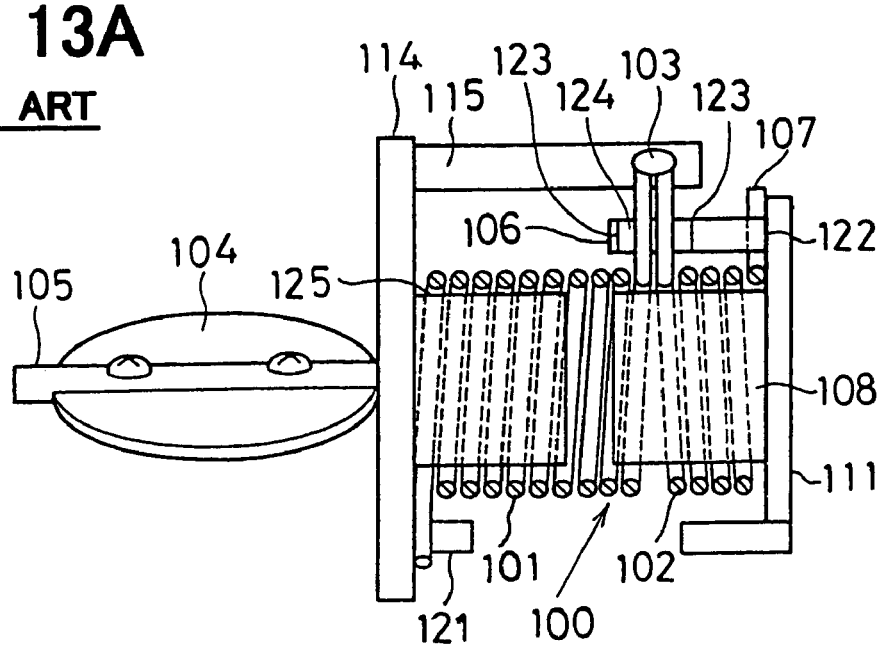
FIGS. 13A and 13B are explanatory diagrams of a structure of the electronically controlled throttle control apparatus of the prior art.
Figure 13B:
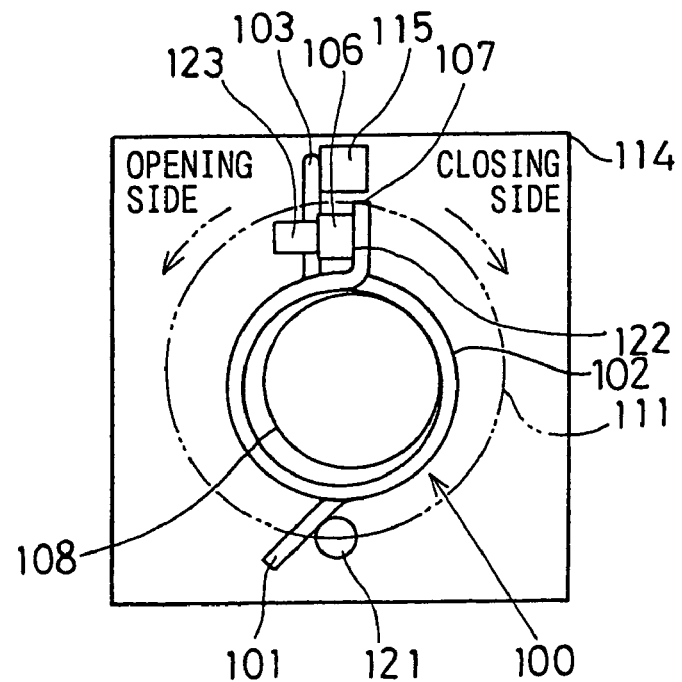
Figure 14A:
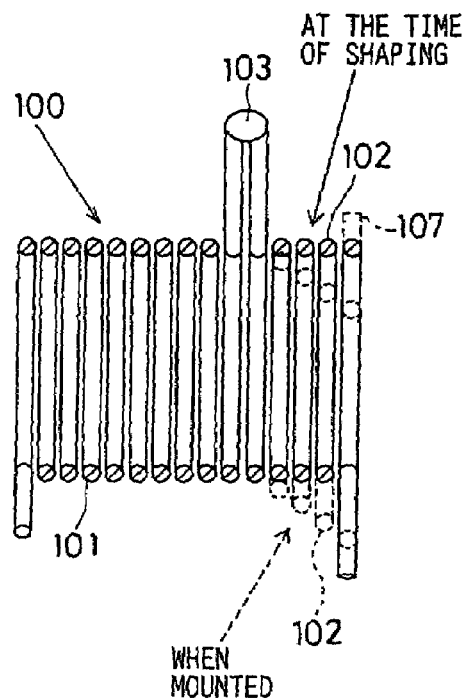
FIG. 14A is a side view of a single coil spring.
Figure 14B:
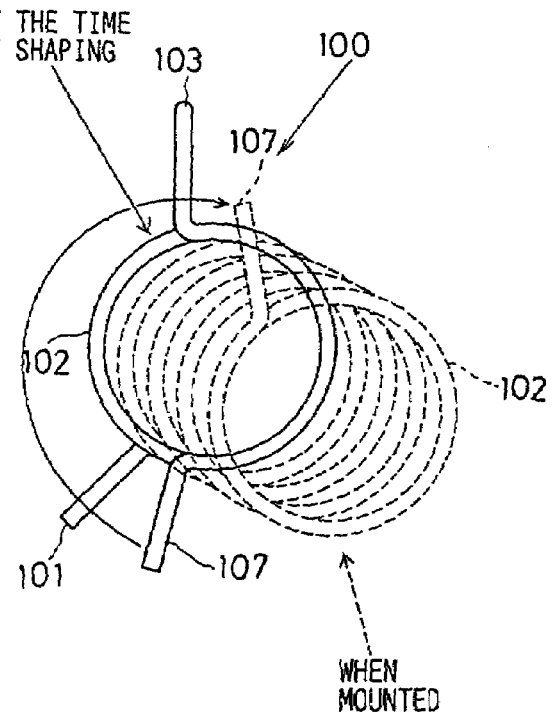
FIG. 14B is a side view of the single coil spring of the prior art.
Figure 15A:
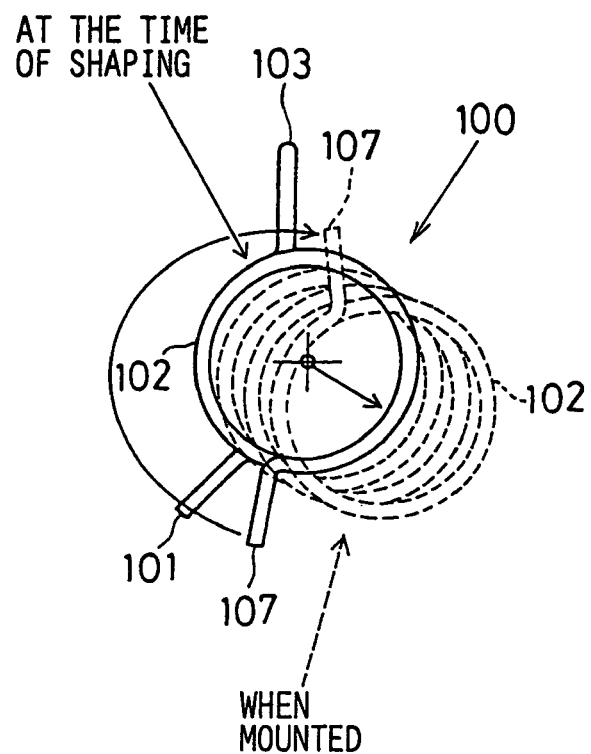
FIG. 15A is a front view of the single coil spring.
Figure 15B:
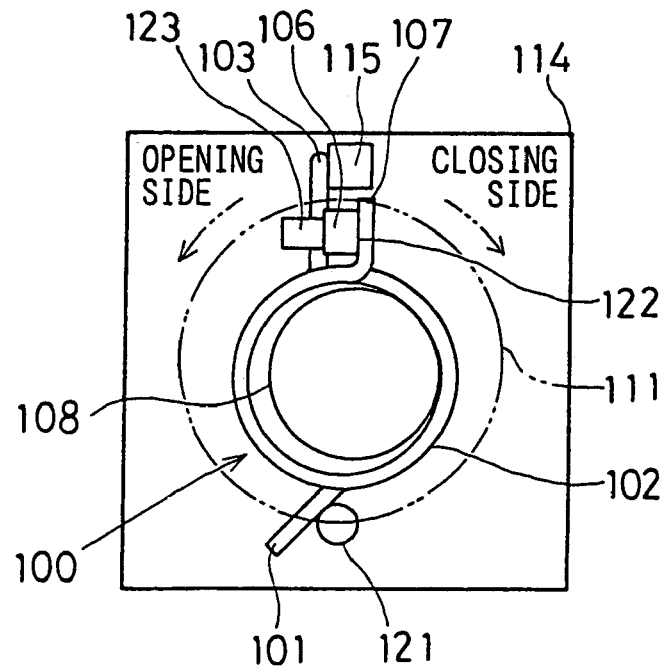
FIG. 15B is a diagram of an essential structure of the electronically controlled throttle control apparatus of the prior art.

FIGS. 10 and 11 show a fourth embodiment of the present invention. FIG. 10 is a diagram showing a single coil spring and a valve gear. FIG. 11 is a diagram showing the single coil spring.

In the present embodiment, the other end of the default spring 62 of the single coil spring 6 is extended in an S-shape so as to approach the U-shaped hook part 63, and this S-shaped part makes the spring gear-side hook 65. Then, the spring body-side hook 64, which is the one end of the return spring 61 of the single coil spring 6, is locked by the first locking part 27 of the throttle body 1. In addition, the spring gear-side hook 65 of the default spring 62 of the single coil spring 6 is locked by the second locking part 54 of an opener member 57a of the valve gear 9. Besides, the U-shaped hook part 63 of the single coil spring 6 is engaged with the engaging part 55 which is formed between the anti-sideslip guides 56 of the opener member 52 of the valve gear 9.

Moreover, in the present embodiment, the second locking part 54 and the engaging part 55 of the opener member 57a of the valve gear 9, i.e., the spring gear-side hook 65 and the U-shaped hook part 63 of the single coil spring 6 are arranged at a predetermined distance in the circumferential direction of the valve gear 9 and the spring inner periphery guide 53 (for example, generally on the same circumference). That is, the second locking part 54 is formed on the opener member 57a which is extended leftward in the diagram from an external wall part 58 of the valve gear 9 surrounding an annular accommodation part (not shown) for accommodating the default spring 62. Incidentally, a recessed portion 59 is formed in the bottom of the opener member 57a so as not to make contact with the other end of the default spring 62 of the single coil spring 6. A window part 60 having this recessed portion 59 opens to the left in the diagram so that the spring gear-side hook 65 can be passed through in mounting the single coil spring 6 onto the valve gear 9. Besides, the opener members 52 and 57a are integrally formed on the external wall part 58.

Here, in the cases of the second and third embodiments, when the single coil spring 6 is mounted onto the valve gear 9, i.e., when the one end of the default spring 62 of the single coil spring 6, or the U-shaped hook part 63, is mounted on the engaging part 55 of the opener member 52 of the valve gear 9 and then the other end of the default spring 62 of the single coil spring 6, or the spring gear-side hook 65, is mounted on the second locking part 54 of the opener member 52 of the valve gear 9, the default spring 62 rotates about the second locking part 54 in the rotational direction leftward in the diagram so that sliding can occur between the inner surface (inner periphery) of the default spring 62 of the single coil spring 6 and the outer periphery of the spring inner periphery guide 53 of the valve gear 9. In particular, since the default spring 62 is smaller in the number of turns of the spring coil than the return spring 61, it has a higher spring constant (rigidity) and exerts higher force for making sliding contact with the outer periphery of the spring inner periphery guide 53 under rotation.

Then, in the present embodiment, the second locking part 54 and the engaging part 55 of the opener member 57a of the valve gear 9, i.e., the spring gear-side hook 65 and the U-shaped hook part 63 of the single coil spring 6 are arranged at a predetermined distance in the circumferential direction of the valve gear 9 and the spring inner periphery guide 53 (for example, generally on the same circumference), and the one end of the default spring 62 of the single coil spring 6, or the U-shaped hook part 63, and the other end, or the spring gear-side hook 65, are held as sandwiched between the second locking part 54 and the engaging part 55 of the valve gear 9. Thereby, when the single coil spring 6 is mounted onto the valve gear 9, i.e., when the U-shaped hook part 63 of the single coil spring 6 is mounted on the engaging part 55 of the opener member 52 of the valve gear 9 and then the spring gear-side hook 65 of the default spring 62 of the single coil spring 6 is mounted on the second locking part 54 of the opener member 57a of the valve gear 9, there occurs no rotation about the second locking part 54 nor sliding between the inner surface (inner periphery) of the default spring 62 of the single coil spring 6 and the outer periphery of the spring inner periphery guide 53 of the valve gear 9.

Consequently, it is possible to mount the single coil spring 6 onto the throttle body 1 and the valve gear 9 while securing a generally cylindrical gap between the outer periphery of the spring inner periphery guide 53 of the valve gear 9 and the inner periphery of the default spring 62; therefore, the sliding resistance during the relative movement in driving the throttle valve 3 from the intermediate position (default position) toward the fully-closed position can be reduced significantly as compared to the conventional articles. The same effects as those of the second embodiment can thus be achieved.

The present embodiment uses the single coil spring 6 having the coil configuration that the center axis of the default spring 62 is previously decentered in a direction opposite to that of rotational deformation occurring when the other end of the default spring 62 is set to the second locking part 54 of the opener member 52 of the valve gear 9 and the U-shaped hook part 63 is set to the engaging part 55 of the opener member 52. Nevertheless, the center axis of the default spring 62 need not be previously decentered in the direction opposite to that of rotational deformation.

MODIFIED EXAMPLES

While the present embodiments have dealt with the case where the Hall device 13 is used as the detecting device of a noncontact type, a Hall IC, a magneto-resistive device, or the like may be used as the detecting device of noncontact type. Moreover, while the present embodiments have dealt with the case where the permanent magnets 11 of split type are used as the magnetic field generating source, a permanent magnet of cylindrical shape may be used as the magnetic field generating source.

Incidentally, the single coil spring 6, i.e., the return spring (first spring part) 61 or the default spring (second spring part) 62, or the default spring (second spring part) 62 in particular, may be a regular pitch coil having a coil outside diameter generally constant in the direction of the center axis and a constant coil pitch, a variable pitch coil having a coil outside diameter generally constant in the direction of the center axis and varying coil pitches, or a nonlinear spring (such as a spring of hourglass shape, a spring of barrel shape, and a spring of truncated cone shape) varying in the coil outside diameter in the direction of the center axis.

In the present embodiments, the opener member 52 and the spring inner periphery guide 53 are integrally formed on the opposed surface of the valve gear (rotator) 9 which constitutes a component of the geared reduction device (power transmission device) for transmitting the rotational output of the drive motor 5 to the throttle valve 3 (the opposed surface opposed to the external wall surface of the bore wall part 2). Nevertheless, the opener member and the spring inner periphery guide may be integrally formed on the periphery of the throttle shaft 4 which makes integral rotation with the throttle valve 3. In this case, the throttle shaft 4 constitutes the rotator.

[Other Embodiments]

In the present embodiment, at least one or a plurality of groove portions (concave portions) 57 are provided as the abrasive dust removing means for removing abrasive dust at least from the sliding contact portion (sliding contact surface) between the outer periphery of the spring inner periphery guide 53 of the valve gear 9 and the inner periphery of the default spring 62 of the coil spring 6. Nevertheless, at least two or a plurality of convex portions may be provided as the abrasive dust removing means. In this case, the foregoing abrasive dust can be actively captured (swept) into between two adjoining convex portions formed on the outer periphery of the spring inner periphery guide 53. Moreover, convex portions and concave portions may be formed circumferentially alternately on/in the sliding contact surface of a member for making sliding contact with the coil spring 6 (for example, the outer periphery of the spring inner periphery guide 53 of the valve gear 9).

In addition, the plurality of concave portions or convex portions may be given a sectional configuration of circular shape, elliptic shape, oval shape, semi-circular shape, semi-elliptic shape, semi-oval shape, or triangular or higher-polygonal shape. Moreover, a plurality of concave portions or convex portions may be formed in the axial directions alone. Moreover, the plurality of concave portions or convex portions need not be all identical in axial dimension, groove width, groove depth, sectional configuration, etc. Concave portions or convex portions of different configurations arbitrarily selected from these may be provided. The plurality of concave portions or convex portions may also be arranged irregularly (at random or with offsets), not at regular intervals. Moreover, the plurality of concave portions or convex portions may be formed at a predetermined tilt angle with respect to the axial direction.

Moreover, a plurality of groove portions (concave portions) having bottoms of, for example, spherical shape, flat shape, or polygonal shape, or a plurality of convex portions having top surfaces of, for example, spherical shape, flat shape, or polygonal shape may be formed irregularly (at random or with offsets) in/on the outer periphery of the spring inner periphery guide 53, for example. Moreover, a plurality of concave portions or convex portions may be arranged in a lattice pattern or a net pattern. It is also possible to adopt such configuration that two concave portions or convex portions adjoining in the circumferential direction are connected in part. Incidentally, in the case of concave portions such as a plurality of groove portions, it is possible to adopt ones having openings narrower than the bottoms in sectional area, ones having wider openings, or ones having generally identical openings and bottoms.

Furthermore, at least one or a plurality of concave portions or at least two or a plurality of convex portions as the abrasive dust removing means for removing abrasive dust at least from the sliding contact portion (sliding contact surface) between the spring inner periphery guide 53 of the valve gear 9 and the default spring 62 of the coil spring 6 may be arranged over the entire circumference of the sliding contact surface of a member for making sliding contact with the default spring 62 of the coil spring 6 (for example, the outer periphery of the spring inner periphery guide 53 of the valve gear 9). This facilitates fabrication as compared to the cases where the abrasive dust removing means is formed in/on part of the outer periphery of the spring inner periphery guide 53.

In the present embodiment, the plurality of groove portions (concave portions) 57 are formed as the abrasive dust removing means in the outer periphery of the spring inner periphery guide 53 which is integrally formed on the valve gear (rotator) 9 constituting a component of the power transmission device. Nevertheless, when the coil spring 6 is fitted to the outer side of the throttle shaft 4, the plurality of groove portions (concave portions) 57 as the abrasive dust removing means may be formed in the outer periphery of a spring inner periphery guide that is integrally formed on the periphery of the throttle shaft 4. In this case, the throttle shaft 4 constitutes the rotator.

While the present embodiment has dealt with the case where the Hall device 13 is used as the detecting device of noncontact type, the detecting device of noncontact type may use a Hall IC, a magneto-resistive device, or the like. Moreover, while the present embodiment has dealt with the case where the permanent magnets 11 of split type are used as the magnetic field generating source, the magnetic field generating source may use a permanent magnet of cylindrical shape. Besides, the throttle shaft 4 for transmitting the rotational power of the actuator such as the drive motor 5 to the throttle valve 3 or the power transmission device such as the geared reduction device may be provided with abrasive dust anti-scattering means such as a cover for annularly surrounding the sliding contact portion (sliding contact surface) between the power transmission device and the coil spring 6. In this case, scattering at least from the sliding contact portion between the power transmission device and the coil spring 6 (for example, toward the gear meshing part of the geared reduction device) can be prevented.

What is claimed is:

1. An electronically controlled throttle control apparatus comprising:

a throttle body defining an intake duct inside;

a throttle valve located in said intake duct;

a coil spring for biasing said throttle valve in a fully-open direction and a fully-closed direction; and a power transmission device for transmitting rotational power of an actuator to said throttle valve and driving said throttle valve in the fully-open direction or fully-closed direction, wherein said power transmission device has means for removing abrasive dust occurring from a member that makes sliding contact with said coil spring or abrasive dust resulting from said coil spring itself because of sliding contact with said member, at least at a sliding contact portion with said coil spring.

2. The electronically controlled throttle control apparatus according to claim 1, wherein
said throttle valve is held and fixed by a throttle shaft rotatably supported by said throttle body; and
said power transmission device has a rotator for rotationally driving said throttle valve and said throttle shaft.

3. The electronically controlled throttle control apparatus according to claim 2, wherein
said abrasive dust removing means is a plurality of concave portions or convex portions formed about the outer periphery of said rotator; and
said plurality of concave portions or convex portions are arranged at predetermined circumferential intervals about the entire outer periphery of said rotator or arranged at predetermined circumferential intervals only across a sliding contact portion of said rotator with said coil spring.

4. The electronically controlled throttle control apparatus according to claim 2, wherein
said rotator has a spring inner periphery guide for biasing the inner side of said coil spring;
said abrasive dust removing means is a plurality of concave portions or convex portions formed about the outer periphery of said spring inner periphery guide; and
said plurality of concave portions or convex portions are arranged at predetermined circumferential intervals about the entire outer periphery of said spring inner periphery guide or arranged at predetermined circumferential intervals only across a sliding contact portion of said spring inner periphery guide with said coil spring.

5. The electronically controlled throttle control apparatus according to claim 2, wherein
said rotator is integrally provided with an opener member for making integral rotation with said throttle shaft; and
said coil spring is a single spring of coil form integrating a first spring part having a return spring function of biasing said throttle valve via said opener member in a direction of returning from a fully-open position to an intermediate position and a second spring part having an opener spring function of biasing said throttle valve via said opener member in a direction of returning from a fully-closed position to the intermediate position.

6. The electronically controlled throttle control apparatus according to claim 5, wherein
said coil spring is a single spring of coil form in which a coupling portion between said first spring part and said second spring part is bent into a generally inverted U-shape to form a U-shaped hook part, and one axial end of said first spring part and the other axial end of said second spring part are wound in different directions.

7. The electronically controlled throttle control apparatus according to claim 5, wherein
said throttle body has an intermediate stopper member for locking said U-shaped hook part to hold said throttle valve in the intermediate position when electric power to said actuator is interrupted for any reason, and a first locking part for locking one end of said first spring part; and said opener member has an engaging part for detachably engaging with said U-shaped hook part, and a second locking part for locking the other end of said second spring part.

8. The electronically controlled throttle control apparatus according to claim 5, wherein
said rotator is a valve gear integrated with said throttle shaft, and has a spring inner periphery guide for holding at least the inner side of said second spring part;
said abrasive dust removing means is a plurality of concave portions or convex portions formed about the outer periphery of said spring inner periphery guide; and
said plurality of concave portions or convex portions are arranged at predetermined circumferential intervals about the entire outer periphery of said spring inner periphery guide or arranged at predetermined circumferential intervals only across a sliding contact portion of said spring inner periphery guide with said second spring part.

9. The electronically controlled throttle control apparatus according to claim 1, wherein
said abrasive dust removing means is a plurality of concave portions or convex portions; and
said plurality of concave portions or convex portions have edge portions for scraping off said abrasive dust adhering to said coil spring.

10. An electronically controlled throttle control apparatus comprising:
a throttle body defining an intake duct inside;
a throttle valve situated in said intake duct;
(c) a coil spring for biasing said throttle valve in a fully-open direction or a fully-closed direction; and
a power transmission device for transmitting rotational power of an actuator to said throttle valve and driving said throttle valve in the fully-open direction and fully-closed direction, wherein
said power transmission device further comprising:
means for preventing abrasive dust, occurring from a member for making sliding contact with said coil spring or abrasive dust occurring from said coil spring itself because of sliding contact with said member, from being scattered at least from a sliding contact portion with said coil spring.

11. An electronically controlled throttle control apparatus according to claim 1, wherein
said actuator is a drive motor having an output shaft to rotate when energized;
said power transmission device is a reduction gear device for reducing the rotational speed of said drive motor to a predetermined reduction ratio, having a pinion gear fixed to said output shaft of said drive motor, an intermediate reduction gear for meshing with this pinion gear for rotation, and a rotator for meshing with this intermediate reduction gear for rotation;
said coil spring is mounted between an external wall surface of said throttle body and an opposed surface of said rotator, is locked by said throttle body at a first end, and is locked by said rotator at a second end; and
the individual gears constituting said reduction gear device are rotatably accommodated in an actuator case.

* * * * *